US011602717B2

(12) United States Patent
Song et al.

(10) Patent No.: US 11,602,717 B2
(45) Date of Patent: *Mar. 14, 2023

(54) CATALYTIC EFFICIENCY OF FLUE GAS FILTRATION

(71) Applicant: W. L. Gore & Associates, Inc., Newark, DE (US)

(72) Inventors: Zhuonan Song, Newark, DE (US); Stephen Stark, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/382,251

(22) Filed: Jul. 21, 2021

(65) Prior Publication Data
US 2021/0346840 A1    Nov. 11, 2021

Related U.S. Application Data

(63) Continuation of application No. 17/083,077, filed on Oct. 28, 2020, now Pat. No. 11,071,947, which is a continuation-in-part of application No. 16/894,338, filed on Jun. 5, 2020, now Pat. No. 10,940,471.

(60) Provisional application No. 62/980,692, filed on Feb. 24, 2020, provisional application No. 62/928,128, filed on Oct. 30, 2019.

(51) Int. Cl.
B01D 39/20      (2006.01)
B01D 53/86      (2006.01)
B01D 53/88      (2006.01)
B01D 71/36      (2006.01)
B01J 35/04      (2006.01)
B01J 35/06      (2006.01)
B01D 53/90      (2006.01)

(52) U.S. Cl.
CPC ..... *B01D 53/8628* (2013.01); *B01D 39/2072* (2013.01); *B01D 53/885* (2013.01); *B01D 53/90* (2013.01); *B01D 71/36* (2013.01); *B01J 35/04* (2013.01); *B01J 35/065* (2013.01); B01D 2239/0407 (2013.01); B01D 2251/106 (2013.01); B01D 2251/2062 (2013.01); B01D 2255/915 (2013.01); B01D 2257/404 (2013.01)

(58) Field of Classification Search
CPC .. B01D 39/083; B01D 2255/30; B01D 53/56; B01D 2251/104; B01D 39/2082; B01D 69/145; B01D 2258/0283; B01D 2325/10; B01D 2251/602; B01D 2255/2073; B01D 2255/915; B01D 53/8631; B01D 2255/20707; B01D 2239/0407; B01D 2255/20769; B01D 2255/20723; B01D 53/8625; B01D 53/8696; B01D 53/90; B01D 39/2017; B01D 39/2072; B01D 2239/0478; B01D 2239/065; B01D 2251/2062; B01D 71/36; B01D 2251/106; B01D 2251/608; B01D 53/8628; B01D 2239/0654; B01D 2251/10; B01D 2255/20776; B01D 2255/2092; B01D 39/1623; B01D 53/885; B01D 2257/404; B01D 39/1692; B01J 38/04; B01J 35/065; B01J 38/06; B01J 35/04
See application file for complete search history.

(56) References Cited

U.S. PATENT DOCUMENTS

| 3,577,707 | A   | 5/1971  | White |
| 4,110,183 | A   | 8/1978  | Furuta et al. |
| 5,120,508 | A   | 6/1992  | Jones |
| 5,620,669 | A   | 4/1997  | Plinke et al. |
| 5,843,390 | A   | 12/1998 | Plinke et al. |
| 6,331,081 | B1  | 12/2001 | Ohtsuka et al. |
| 6,331,351 | B1  | 12/2001 | Waters et al. |
| 6,676,912 | B1  | 1/2004  | Cooper et al. |
| 7,776,299 | B2  | 8/2010  | Schoubye et al. |
| 9,816,755 | B2  | 11/2017 | Beasse et al. |
| 10,940,471 | B1* | 3/2021 | Song .................. B01J 23/22 |
| 11,071,947 | B2* | 7/2021 | Song .................. B01D 39/2072 |
| 2007/0154374 | A1 | 7/2007 | Johnson et al. |
| 2008/0034739 | A1 | 2/2008 | Ranalli |
| 2010/0206202 | A1 | 8/2010 | Darde et al. |
| 2010/0269491 | A1* | 10/2010 | Boorse .................. F01N 3/022 60/299 |
| 2011/0000189 | A1 | 1/2011 | Mussmann et al. |
| 2011/0173951 | A1 | 7/2011 | Spurk et al. |
| 2012/0141346 | A1 | 6/2012 | Pfeffer et al. |
| 2015/0078978 | A1 | 3/2015 | Block et al. |
| 2018/0045097 | A1 | 2/2018 | Tang et al. |

(Continued)

FOREIGN PATENT DOCUMENTS

CN      1771088 A      5/2006
CN      1832794 A      9/2006

(Continued)

OTHER PUBLICATIONS

Wang et al., "Sinultaneous Fast Decomposition of NH4HS04 and Efficient Nox Removal by NO2 Addition: An Option for NOx Removal in H20/S02-Contained Flue Gas at a Low Temperature," Energy & Fuels (May 24, 2018); 32 (6):6990-6994.

(Continued)

*Primary Examiner* — Timothy C Vanoy

(57) ABSTRACT

Some embodiments of the present disclosure relate to a method of regenerating at least one filter medium comprising: providing at least one filter medium, wherein the at least one filter medium comprises: at least one catalyst material; and ammonium bisulfate (ABS) deposits, ammonium sulfate (AS) deposits, or any combination thereof; flowing a flue gas stream transverse to a cross-section of a filter medium, such that the flue gas stream passes through the cross section of the at least one filter medium, wherein the flue gas stream comprises: NOx compounds comprising: Nitric Oxide (NO), and Nitrogen Dioxide ($NO_2$); and increasing an NOx removal efficiency of the at least one filter medium after removal of deposits.

20 Claims, 11 Drawing Sheets

(56) References Cited

U.S. PATENT DOCUMENTS

| | | |
|---|---|---|
| 2018/0345190 A1 | 12/2018 | Stark et al. |
| 2019/0240620 A1 | 8/2019 | Zhang et al. |

FOREIGN PATENT DOCUMENTS

| | | | |
|---|---|---|---|
| CN | 102405092 A | 4/2012 | |
| CN | 102463015 A | 6/2014 | |
| CN | 105525967 A | 4/2016 | |
| CN | 107051203 A | 8/2017 | |
| CN | 107376930 A | 11/2017 | |
| CN | 107407173 A | 11/2017 | |
| CN | 207591613 U | 7/2018 | |
| CN | 108472589 A | 8/2018 | |
| CN | 110102160 A | 8/2019 | |
| DE | 102004045178 A1 | 3/2006 | |
| DE | 102007060623 A1 | 6/2009 | |
| EP | 1236498 A1 | 9/2002 | |
| EP | 2044997 A1 | 4/2009 | |
| EP | 2772293 A1 | 9/2014 | |
| EP | 3 815 787 A1 * | 5/2021 | ............ B01J 38/04 |
| EP | 3815787 A1 | 5/2021 | |
| JP | H0775720 A | 3/1995 | |
| JP | 07-088368 A | 4/1995 | |
| JP | H09-290136 A | 11/1997 | |
| KR | 100681161 B1 | 2/2007 | |
| KR | 101519900 B1 | 5/2015 | |
| WO | 2005/028082 A1 | 3/2005 | |
| WO | 2005/065805 A1 | 7/2005 | |
| WO | 2017/160646 A2 | 9/2017 | |
| WO | 2018/036417 A1 | 3/2018 | |
| WO | 2019/099025 A1 | 5/2019 | |
| WO | 2021/089471 A1 | 5/2021 | |

OTHER PUBLICATIONS

Wang et al., "Promotion of N H4HSO4 decomposition in NO/NO2 contained atmosphere at low temperature over V2O5-WO3/TiO2 catalyst for NO reduction" Applied Catalysis A General, 559 (2018) pp. 112-121.

Baltin et al. "Sulfuric acid formation over ammonium sulfate loaded V2O5-WO3/TiO2 catalysts by DeNOx reaction with NOx" Catalysis Today, 75, (2002) pp. 339-345.

Kasper et al. "Control of Nitrogen Oxide Emissions by Hydrogen Peroxide-enhanced Gas-phase Oxidation of Nitric Oxide" Journal of the Air and Waste ManagementAssociation, 46 (2), (1996) pp. 127-133.

Zhao et al. "Optimization of NO Oxidation by H2O2 Thermal Decomposition at Moderate Temperatures" PLoS One, 13 (4):e0192324, (2018).

Ueda et al., "SO3 Removal System for Flue Gas in Plants Firing High-sulfur Residual Fuels", Mitsubishi Heavy Industries Technical Review, vol. 49, No. 4, Dec. 2012.

* cited by examiner

CATALYTIC EFFICIENCY OF FLUE GAS FILTRATION

FIELD

The present disclosure relates to a filter medium, methods of regenerating at least one filter medium, and methods of cleaning a flue gas stream.

BACKGROUND

Coal-fired power generation plants, municipal waste incinerators, and oil refinery plants generate large amounts of flue gases that contain substantial varieties and quantities of environmental pollutants, nitrogen oxides ($NO_x$ compounds), mercury (Hg) vapor, and particulate matters (PM). In the United States, burning coal alone generates about 27 million tons of $SO_2$ and 45 tons of Hg each year. Thus, there is a need for improvements to methods for removing $NO_x$ compounds, sulfur oxides, mercury vapor, and fine particulate matters from industrial flue gases, such as coal-fired power plant flue gas.

SUMMARY

Some aspects of the present disclosure relate to a method comprising:
  providing at least one filter medium;
    wherein the at least one filter medium comprises:
      at least one catalyst material; and
      ammonium bisulfate (ABS) deposits, ammonium sulfate (AS) deposits, or any combination thereof;
  flowing a flue gas stream transverse to a cross-section of the at least one filter medium, such that the flue gas stream passes through the cross section of the at least one filter medium,
  wherein the flue gas stream comprises:
    $NO_x$ compounds comprising:
      Nitric Oxide (NO), and
      Nitrogen Dioxide ($NO_2$); and
  increasing $NO_x$ removal efficiency of the at least one filter medium;
    wherein the increasing of the $NO_x$ removal efficiency of the at least one filter medium comprises increasing an upstream $NO_2$ concentration to a range from 2% to 99% of a total concentration of the upstream $NO_x$ compounds, wherein increasing the upstream $NO_2$ concentration to a range from 2% to 99% of a total concentration of the upstream $NO_x$ compounds comprises introducing additional $NO_2$ into the flue gas stream; and
wherein the method regenerates the at least one filter medium.

Some aspects of the present disclosure relate to a method comprising:
  providing at least one filter medium
    wherein the at least one filter medium comprises at least one catalyst material;
  flowing a flue gas stream transverse to a cross-section of the at least one filter medium, such that the flue gas stream passes through the cross section of the at least one filter medium from an upstream side of the filter medium to a downstream side of the filter medium;
  wherein the flue gas stream comprises:
    $NO_x$ compounds comprising:
      Nitric Oxide (NO), and
      Nitrogen Dioxide ($NO_2$);
    Sulfur Dioxide ($SO_2$); and
    Ammonia ($NH_3$);
  maintaining a constant $NO_x$ removal efficiency of the at least one filter medium;
    wherein the maintaining a constant $NO_x$ removal efficiency of the at least one filter medium comprises:
      providing an $NO_2$ concentration, measured from the upstream side of the filter medium, in a range from 2% to 99% of a total concentration of the $NO_x$ compounds, wherein providing the $NO_2$ concentration, measured from the upstream side of the filter medium, in a range from 2% to 99% of a total concentration of the $NO_x$ compounds comprises introducing additional $NO_2$ into the flue gas stream; and
      controlling the $NO_2$ concentration, measured from the downstream side of the filter medium, to a range of from 0.0001% to 0.5% of the concentration of the flue gas stream;
wherein the method cleans the flue gas stream.

Some aspects of the present disclosure relate to a system comprising:
  at least one filter medium,
    wherein the at least one filter medium comprises:
      an upstream side;
      a downstream side;
      at least one catalyst material; and
      ammonium bisulfate (ABS) deposits, ammonium sulfate (AS) deposits, or any combination thereof;
  at least one filter bag,
    wherein the at least one filter medium is disposed within the at least one filter bag; and
  at least one filter bag housing,
    wherein the at least one filter bag is disposed within the at least one filter bag housing;
    wherein the at least one filter bag housing is configured to receive a flow of a flue gas stream transverse to a cross-section of the at least one filter medium, such that the flue gas stream passes through the cross section of the at least one filter medium from the upstream side of the at least one filter medium to the downstream side of the at least one filter medium,
    wherein the flue gas stream comprises:
      $NO_x$ compounds comprising:
        Nitric Oxide (NO), and
        Nitrogen Dioxide ($NO_2$); and
  wherein the system is configured to increase a $NO_x$ removal efficiency of the at least one filter medium when an upstream $NO_2$ concentration is increased to a range from 2% to 99% of a total concentration of the upstream $NO_x$ compounds, and wherein the upstream $NO_2$ concentration is increased to a range from 2% to 99% of a total concentration of the upstream $NO_x$ compounds by introducing additional $NO_2$ into the flue gas stream.

Some aspects of the present disclosure relate to a method comprising:
  providing at least one filter medium
    wherein the at least one filter medium comprises at least one catalyst material;
  flowing a flue gas stream transverse to a cross-section of the at least one filter medium, such that the flue gas stream passes through the cross section of the at least one filter medium from an upstream side of the filter medium to a downstream side of the filter medium;
  wherein the flue gas stream comprises:
    $NO_x$ compounds comprising:
      Nitric Oxide (NO), and
      Nitrogen Dioxide ($NO_2$);
    Sulfur Dioxide ($SO_2$); and
    Ammonia ($NH_3$);

maintaining a $NO_x$ removal efficiency of the at least one filter medium in an amount of at least 70% of an initial $NO_x$ efficiency by:
  providing an $NO_2$ concentration, measured from the upstream side of the filter medium, in a range from 2% to 99% of a total concentration of the $NO_x$ compounds, wherein providing the $NO_2$ concentration, measured from the upstream side of the filter medium, in a range from 2% to 99% of a total concentration of the $NO_x$ compounds comprises introducing additional $NO_2$ into the flue gas stream; and
  controlling $NO_2$ concentration, measured from the downstream side of the filter medium, to a range of from 0.0001% to 0.5% of the concentration of the flue gas stream
wherein the method cleans the flue gas stream.

Some aspects of the present disclosure relate to a method comprising:
  providing at least one filter medium;
    wherein the at least one filter medium comprises:
      at least one catalyst material; and
      ammonium bisulfate (ABS) deposits, ammonium sulfate (AS) deposits, or any combination thereof;
  flowing a flue gas stream transverse to a cross-section of the at least one filter medium, such that the flue gas stream passes through the cross section of the at least one filter medium,
    wherein the flue gas stream comprises:
      $NO_x$ compounds comprising:
        Nitric Oxide (NO), and
        Nitrogen Dioxide ($NO_2$); and
  increasing $NO_x$ removal efficiency of the at least one filter medium;
    wherein the increasing of the $NO_x$ removal efficiency of the at least one filter medium comprises increasing an upstream $NO_2$ concentration to a range from 2% to 99% of a total concentration of the upstream $NO_x$ compounds, wherein increasing the upstream $NO_2$ concentration to a range from 2% to 99% of a total concentration of the upstream $NO_x$ compounds comprises introducing at least one oxidizing agent into the flue gas stream;
wherein the method regenerates the at least one filter medium.

Some aspects of the present disclosure relate to a method comprising:
  providing at least one filter medium
    wherein the at least one filter medium comprises at least one catalyst material;
  flowing a flue gas stream transverse to a cross-section of the at least one filter medium, such that the flue gas stream passes through the cross section of the at least one filter medium from an upstream side of the filter medium to a downstream side of the filter medium;
    wherein the flue gas stream comprises:
      $NO_x$ compounds comprising:
        Nitric Oxide (NO), and
        Nitrogen Dioxide ($NO_2$);
      Sulfur Dioxide ($SO_2$); and
      Ammonia ($NH_3$);
  maintaining a constant $NO_x$ removal efficiency of the at least one filter medium;
    wherein the maintaining a constant $NO_x$ removal efficiency of the at least one filter medium comprises:
      providing an $NO_2$ concentration, measured from the upstream side of the filter medium, in a range from 2% to 99% of a total concentration of the $NO_x$ compounds, wherein providing the $NO_2$ concentration, measured from the upstream side of the filter medium, in a range from 2% to 99% of a total concentration of the $NO_x$ compounds comprises introducing at least one oxidizing agent into the flue gas stream; and
      controlling the $NO_2$ concentration, measured from the downstream side of the filter medium, to a range of from 0.0001% to 0.5% of the concentration of the flue gas stream;
wherein the method cleans the flue gas stream.

Some aspects of the present disclosure relate to a system comprising:
  at least one filter medium,
    wherein the at least one filter medium comprises:
      an upstream side;
      a downstream side;
      at least one catalyst material; and
      ammonium bisulfate (ABS) deposits, ammonium sulfate (AS) deposits, or any combination thereof;
  at least one filter bag,
    wherein the at least one filter medium is disposed within the at least one filter bag; and
  at least one filter bag housing,
    wherein the at least one filter bag is disposed within the at least one filter bag housing;
    wherein the at least one filter bag housing is configured to receive a flow of a flue gas stream transverse to a cross-section of the at least one filter medium, such that the flue gas stream passes through the cross section of the at least one filter medium from the upstream side of the at least one filter medium to the downstream side of the at least one filter medium,
    wherein the flue gas stream comprises:
      $NO_x$ compounds comprising:
        Nitric Oxide (NO), and
        Nitrogen Dioxide ($NO_2$); and
  wherein the system is configured to increase an $NO_x$ removal efficiency of the at least one filter medium when an upstream $NO_2$ concentration is increased to a range from 2% to 99% of a total concentration of the upstream $NO_x$ compounds, and wherein the upstream $NO_2$ concentration is increased to a range from 2% to 99% of a total concentration of the upstream $NO_x$ compounds by introducing at least one oxidizing agent into the flue gas stream.

Some aspects of the present disclosure relate to a method comprising:
  providing at least one filter medium
    wherein the at least one filter medium comprises at least one catalyst material;
  flowing a flue gas stream transverse to a cross-section of the at least one filter medium, such that the flue gas stream passes through the cross section of the at least one filter medium from an upstream side of the filter medium to a downstream side of the filter medium;
    wherein the flue gas stream comprises:
      $NO_x$ compounds comprising:
        Nitric Oxide (NO), and
        Nitrogen Dioxide ($NO_2$);
      Sulfur Dioxide ($SO_2$); and
      Ammonia ($NH_3$);
  maintaining a $NO_x$ removal efficiency of the at least one filter medium in an amount of at least 70% of an initial $NO_x$ efficiency by:

providing an $NO_2$ concentration, measured from the upstream side of the filter medium, in a range from 2% to 99% of a total concentration of the $NO_x$ compounds, wherein providing the $NO_2$ concentration, measured from the upstream side of the filter medium, in a range from 2% to 99% of a total concentration of the $NO_x$ compounds comprises introducing at least one oxidizing agent into the flue gas stream; and controlling $NO_2$ concentration, measured from the downstream side of the filter medium, to a range of from 0.0001% to 0.5% of the concentration of the flue gas stream;

wherein the method cleans the flue gas stream.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1A:
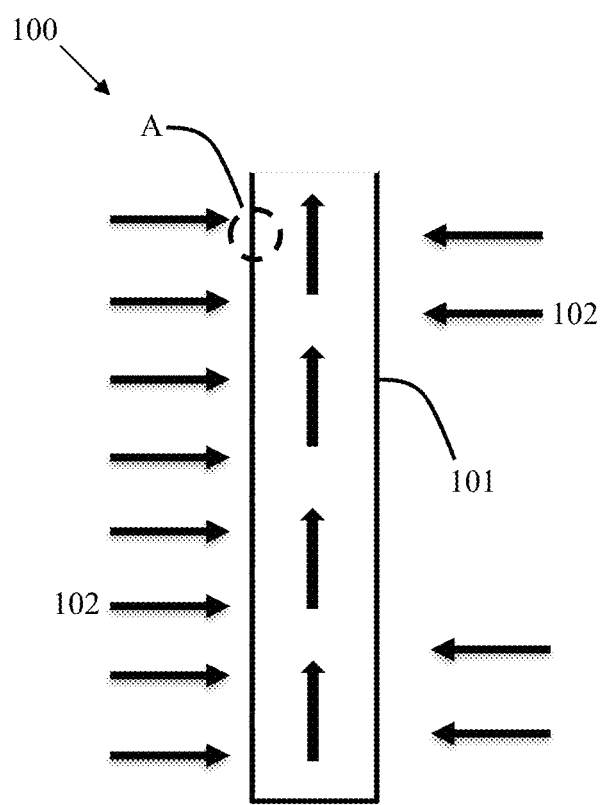
FIGS. 1A-1D depict embodiments of an exemplary filter medium and according to the present disclosure.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

As used herein, the term "flue gas stream" refers to a gaseous mixture that comprises at least one byproduct of a combustion process (such as, but not limited to, a coal combustion process). In some embodiments, a flue gas stream may include at least one gas in an elevated concentration relative to a concentration resulting from the combustion process. For instance, in one non-limiting example, a flue gas stream may be subjected to a "scrubbing" process during which water vapor may be added to the flue gas. Accordingly, in some such embodiments, the flue gas stream may include water vapor in an elevated concentration relative to the initial water vapor concentration due to combustion. Similarly, in some embodiments, a flue gas stream may include at least one gas in a lesser concentration relative to an initial concentration of the at least one gas output from the combustion process. This may occur, for example, by removing at least a portion at least one gas after combustion. In some embodiments, a flue gas may take the form of a gaseous mixture that is a combination of byproducts of multiple combustion processes.

As used herein, the term "flow through" means that a flue gas stream is flowed transverse to a cross section of the at least one filter medium, such that the flue gas stream passes through a cross section of the at least one filter medium. In some embodiments of a "flow through" configuration, the flue gas stream is flowed perpendicular to a cross-section of the at least one filter medium.

As used herein, the term "flow by" means that the flue gas stream is not flowed transverse to a cross section of the at least one filter medium, such that the flue gas does not pass through the cross section of the at least one filter medium. In some embodiments of a "flow by" configuration, the flue gas stream is flowed parallel to a cross-section of the at least one filter medium.

As used herein "upstream" refers to a location of a flue gas stream before entering a filter medium. In the "flow through" context, "upstream" may refer to the location of a flue gas stream before entering a cross section of a filter medium. In the "flow by" context, "upstream" may refer to the location of a flue gas stream before entering an enclosure (e.g., a housing, a filter bag, or other suitable enclosure described herein) that contains a filter medium.

As used herein "downstream" refers to a location of a flue gas stream after exiting a filter medium. In the "flow through" context, "downstream" may refer to the location of a flue gas stream after exiting a cross section of a filter medium. In the "flow by" context, "downstream" may refer to the location of a flue gas stream after exiting an enclosure (e.g., a housing, a filter bag, or other suitable enclosure described herein) that contains a filter medium.

As used herein, the term "$NO_x$ compound" refers to any oxide of nitrogen. In some non-limiting embodiments, "$NO_x$ compound" may specifically refer to gaseous oxides of nitrogen that are known environmental pollutants.

As used herein, the term "catalytic composite article" set forth in the Examples refers to any material that includes a combination of at least one catalyst material and at least one additional material according to any embodiment described herein. The additional material is not limited to any particular type of material and may be, for example, a membrane, a felt batt, a ceramic substrate (including but not limited to a ceramic candle), a honeycomb substrate, a monolith substrate, or any combination thereof. The catalytic composite article may, in some non-limiting examples, be a porous catalytic film.

Some embodiments of the present disclosure relate to a method of regenerating at least one filter medium. As used herein, "regenerating at least one filter medium" means that, after regeneration, the at least one filter medium has a higher removal efficiency of at least one component of the flue gas stream as compared to a removal efficiency of the at least one component of the flue gas stream, prior to regeneration. For example, in some non-limiting embodiments, after regeneration, the at least one filter medium may have a higher removal efficiency of NO, $NO_2$, or combination thereof, as compared to a removal efficiency of the at least one component of the NO, $NO_2$, or combination thereof, prior to regeneration.

In some embodiments, the at least one filter medium comprises at least one catalyst material. In some embodiments, the at least one catalyst material comprises at least one of: Vanadium Monoxide (VO), Vanadium Trioxide ($V_2O_3$), Vanadium Dioxide ($VO_2$), Vanadium Pentoxide ($V_2O_5$), Tungsten Trioxide ($WO_3$), Molybdenum Trioxide ($MoO_3$), Titanium Dioxide ($TiO_2$), Silicon Dioxide ($SiO_2$), Aluminum Trioxide ($Al_2O_3$), Manganese Oxide ($MnO_2$), zeolites, or any combination thereof. In some embodiments, the at least one catalyst material is in the form of catalyst particles.

In some embodiments, the at least one filter medium comprises an upstream side and a downstream side. In some embodiments, the at least one filter medium is disposed within at least one filter bag. In some embodiments, a plurality of filter mediums is disposed within a single filter bag. In some embodiments, the at least one filter bag is housed within at least one filter bag housing. In some embodiments, a plurality of filter bags is disposed within a single filter bag housing.

In some embodiments, the one filter medium comprises a porous protective layer and a porous catalytic layer. In some embodiments, the porous catalytic layer comprises at least one catalyst material. In some embodiments, the at least one catalyst material is disposed on the porous catalytic layer. In some embodiments, the at least one catalyst material is within (e.g., embedded within) the porous catalytic layer.

In some embodiments, the porous protective layer comprises a microporous layer. In some embodiments, the microporous layer comprises an expanded polytetrafluoroethylene (ePTFE) membrane.

In some embodiments, the at least one catalyst material is adhered to the filter medium by at least one adhesive. In some embodiments, the at least one catalyst material is adhered to the porous catalytic layer by at least one adhesive. In some exemplary embodiments, the at least one filter medium is in the form of a filter bag, such that the adherence of the at least one catalyst material to the porous catalytic layer by the at least one adhesive form a coated filter bag. In some embodiments, the at least one catalyst material is in the form of catalyst particles, such that the coated filter bag is coated with the catalyst particles.

In some embodiments, the at least one adhesive is chosen from polytetrafluoroethylene (PTFE), fluorinated ethylene propylene (FEP), high molecular weight polyethylene (HMWPE), high molecular weight polypropylene (HMWPP), perfluoroalkoxy alkane (PFA), polyvinylidene fluoride (PVDF), vinylidene fluoride (THV), chlorofluoroethylene (CFE), or any combination thereof. In some embodiments, the at least one adhesive is selected from the group consisting of polytetrafluoroethylene (PTFE), fluorinated ethylene propylene (FEP), high molecular weight polyethylene (HMWPE), high molecular weight polypropylene (HMWPP), perfluoroalkoxy alkane (PFA), polyvinylidene fluoride (PVDF), vinylidene fluoride (THV), chlorofluoroethylene (CFE), and any combination thereof.

In some embodiments, the porous catalytic layer comprises at least one polymeric substrate. In some embodiments, the at least one polymeric substrate comprises a least one of: polytetrafluorethylene, poly(ethylene-co-tetrafluoroethylene), ultra-high molecular weight polyethylene, polyparaxylylene, polylactic acid, polyimide, polyamide, polyaramid, polyphenylene sulfide, fiberglass, or any combination thereof. In some embodiments, the at least one polymeric substrate is selected from the group consisting of: polytetrafluorethylene, poly(ethylene-co-tetrafluoroethylene), ultra-high molecular weight polyethylene, polyparaxylylene, polylactic acid, polyimide, polyamide, polyaramid, polyphenylene sulfide, fiberglass, and any combination thereof.

In some embodiments, the porous catalytic layer includes at least one ceramic substrate. In some embodiments, the at least one ceramic substrate is in the form of a ceramic candle described herein. In some embodiments, the one ceramic substrate comprises ceramic fibers. In some embodiments, the ceramic fibers comprise alkali metal silicates, alkaline earth metal silicates, aluminosilicates, or any combination thereof.

In some embodiments, the porous catalytic layer is in the form of a layered assembly comprising a porous catalytic film and one or more felt batts. In some embodiments, the one or more felt batts are positioned on at least one side of the porous catalytic film. In some embodiments, the porous catalytic film comprises the at least one catalyst material. In some embodiments, the at least one catalyst material is disposed on the porous catalytic film. In some embodiments, the at least one catalyst material is within (e.g., embedded within) the porous catalytic film.

In some embodiments, the one or more felt batts comprise at least one of: a polytetrafluoroethylene (PTFE) felt, a PTFE fleece, an expanded polytetrafluoroethylene (ePTFE) felt, an ePTFE fleece, a woven fluoropolymer staple fiber, a nonwoven fluoropolymer staple fiber, or any combination thereof. In some embodiments, the one or more felt batts are selected from the group consisting of: a polytetrafluoroethylene (PTFE) felt, a PTFE fleece, an expanded polytetrafluoroethylene (ePTFE) felt, an ePTFE fleece, a woven fluoropolymer staple fiber, a nonwoven fluoropolymer staple fiber, and any combination thereof.

In some embodiments, the porous catalytic film comprises a membrane. In some embodiments, the porous catalytic film comprises a polymer membrane. In some embodiments, the porous catalytic film comprises a fluoropolymer membrane and may be referred to as a porous catalytic fluoropolymer film. In some embodiments, the porous catalytic film comprises an expanded polytetrafluoroethylene (ePTFE) membrane.

In some embodiments, the porous catalytic film comprises catalyst particles enmeshed within the ePTFE membrane. In some embodiments, the ePTFE membrane has a microstructure that includes nodes, fibrils, or any combination thereof. In some embodiments, the catalyst particles may be enmeshed into the microstructure. In some embodiments, the catalyst particles may be enmeshed into the nodes. In some embodiments, the catalyst particles may be enmeshed into the fibrils. In some embodiments, the catalyst particles may be enmeshed into the nodes and fibrils.

In some embodiments, the at least one filter medium is in the form of a ceramic candle. In some embodiments, the ceramic candle comprises at least one ceramic material. In some embodiments, the least one ceramic material is chosen from: silica-aluminate, calcium-magnesium-silicate, calcium-silicate fibers, or any combination thereof. In some embodiments, catalyst particles form a coating on the at least one ceramic material.

In some embodiments, the at least one filter medium may comprise any material configured to capture at least one of solid particulates, liquid aerosols, or any combination thereof from a flue gas stream. In some embodiments, the at least one filter medium is in the form of at least one of: a filter bag, a honeycomb, a monolith or any combination thereof.

In some embodiments, the at least filter medium comprises ammonium bisulfate (ABS) deposits, ammonium sulfate (AS) deposits, or any combination thereof. In some embodiments, ABS deposits are disposed on the at least one catalyst material of the at least one filter medium. In some embodiments, ABS deposits are disposed within the at least one catalyst material of the at least one filter medium. In some embodiments, at least some of the ABS deposits, AS deposits, or any combination thereof may be removed, so as to increase a removal efficiency (e.g., $NO_x$ removal efficiency) of the at least one filter medium, as described in further detail herein, infra.

In some embodiments, the ABS deposits are present in a concentration ranging from 0.01% to 99% by mass of the at least one filter medium during the providing step. In some embodiments, the ABS deposits are present in a concentration ranging from 0.1% to 99% by mass of the at least one filter medium during the providing step. In some embodiments, the ABS deposits are present in a concentration ranging from 1% to 99% by mass of the at least one filter medium during the providing step. In some embodiments, the ABS deposits are present in a concentration ranging from 10% to 99% by mass of the at least one filter medium during the providing step. In some embodiments, the ABS deposits are present in a concentration ranging from 25% to 99% by mass of the at least one filter medium during the providing step. In some embodiments, the ABS deposits are present in a concentration ranging from 50% to 99% by mass of the at least one filter medium during the providing step. In some embodiments, the ABS deposits are present in a concentration ranging from 75% to 99% by mass of the at least one filter medium during the providing step. In some embodiments, the ABS deposits are present in a concentration ranging from 95% to 99% by mass of the at least one filter medium during the providing step.

In some embodiments, the ABS deposits are present in a concentration ranging from 0.01% to 95% by mass of the at least one filter medium during the providing step. In some embodiments, the ABS deposits are present in a concentration ranging from 0.01% to 75% by mass of the at least one filter medium during the providing step. In some embodiments, the ABS deposits are present in a concentration ranging from 0.01% to 50% by mass of the at least one filter medium during the providing step. In some embodiments, the ABS deposits are present in a concentration ranging from 0.01% to 25% by mass of the at least one filter medium during the providing step. In some embodiments, the ABS deposits are present in a concentration ranging from 0.01% to 10% by mass of the at least one filter medium during the providing step. In some embodiments, the ABS deposits are present in a concentration ranging from 0.01% to 1% by mass of the at least one filter medium during the providing step. In some embodiments, the ABS deposits are present in a concentration ranging from 0.01% to 0.1% by mass of the at least one filter medium during the providing step.

In some embodiments, the ABS deposits are present in a concentration ranging from 0.1% to 95% by mass of the at least one filter medium during the providing step. In some embodiments, the ABS deposits are present in a concentration ranging from 1% to 75% by mass of the at least one filter medium during the providing step. In some embodiments, the ABS deposits are present in a concentration ranging from 10% to 50% by mass of the at least one filter medium during the providing step.

In some embodiments, the method of regenerating at least one filter medium comprises flowing a flue gas stream through the at least one filter medium (i.e., transverse to a cross-section of the at least one filter medium), such that the flue gas stream passes through the cross section of the at least one filter medium. In some embodiments, the flue gas stream is flowed from an upstream side to a downstream side of the at least one filter medium. In some embodiments, the flue gas stream is flowed perpendicular to a cross-section of the at least one filter medium.

In some embodiments, the method of regenerating at least one filter medium comprises flowing a flue gas stream by the at least one filter medium (i.e., non-transverse to a cross-section of the at least one filter medium), such that the flue gas stream does not pass through the cross section of the at least one filter medium. In some embodiments, the flue gas stream is flowed parallel to a cross-section of the at least one filter medium.

In some embodiments, the temperature of the flue gas stream ranges from 160° C. to 280° C. during the flowing step. In some embodiments, the temperature of the flue gas stream ranges from 175° C. to 280° C. during the flowing step. In some embodiments, the temperature of the flue gas stream ranges from 200° C. to 280° C. during the flowing step. In some embodiments, the temperature of the flue gas stream ranges from 225° C. to 280° C. during the flowing step. In some embodiments, the temperature of the flue gas stream ranges from 250° C. to 280° C. during the flowing step.

In some embodiments, the temperature of the flue gas stream ranges from 160° C. to 250° C. during the flowing step. In some embodiments, the temperature of the flue gas stream ranges from 160° C. to 225° C. during the flowing step. In some embodiments, the temperature of the flue gas stream ranges from 160° C. to 200° C. during the flowing step. In some embodiments, the temperature of the flue gas stream ranges from 160° C. to 175° C. during the flowing step.

In some embodiments, the temperature of the flue gas stream ranges from 175° C. to 250° C. during the flowing step. In some embodiments, the temperature of the flue gas stream ranges from 200° C. to 225° C. during the flowing step.

In some embodiments, such as embodiments where the at least one filter medium is in the form of or comprises a ceramic substrate (e.g., a ceramic candle), the temperature of the flue gas stream ranges from 170° C. to 450° C. during the flowing step. In some embodiments, such as embodiments where the at least one filter medium is in the form of or comprises a ceramic substrate (e.g., a ceramic candle), the temperature of the flue gas stream ranges from 200° C. to 450° C. during the flowing step. In some embodiments, such as embodiments where the at least one filter medium is in the form of or comprises a ceramic substrate (e.g., a ceramic candle), the temperature of the flue gas stream ranges from 250° C. to 450° C. during the flowing step. In some embodiments, such as embodiments where the at least one filter medium is in the form of or comprises a ceramic substrate (e.g., a ceramic candle), the temperature of the flue gas stream ranges from 300° C. to 450° C. during the flowing step. In some embodiments, such as embodiments where the at least one filter medium is in the form of or comprises a ceramic substrate (e.g., a ceramic candle), the temperature of the flue gas stream ranges from 350° C. to 450° C. during the flowing step. In some embodiments, such as embodiments where the at least one filter medium is in the form of or comprises a ceramic substrate (e.g., a ceramic candle), the temperature of the flue gas stream ranges from 400° C. to 450° C. during the flowing step.

In some embodiments, such as embodiments where the at least one filter medium is in the form of or comprises a ceramic substrate (e.g., a ceramic candle), the temperature of the flue gas stream ranges from 170° C. to 400° C. during the flowing step. In some embodiments, such as embodiments where the at least one filter medium is in the form of or comprises a ceramic substrate (e.g., a ceramic candle), the temperature of the flue gas stream ranges from 170° C. to 350° C. during the flowing step. In some embodiments, such as embodiments where the at least one filter medium is in the form of or comprises a ceramic substrate (e.g., a ceramic candle), the temperature of the flue gas stream ranges from 170° C. to 300° C. during the flowing step. In some embodiments, such as embodiments where the at least one filter medium is in the form of or comprises a ceramic substrate (e.g., a ceramic candle), the temperature of the flue gas stream ranges from 170° C. to 250° C. during the flowing step. In some embodiments, such as embodiments where the at least one filter medium is in the form of or comprises a ceramic substrate (e.g., a ceramic candle), the temperature of the flue gas stream ranges from 170° C. to 200° C. during the flowing step.

In some embodiments, such as embodiments where the at least one filter medium is in the form of a or comprises ceramic substrate (e.g., a ceramic candle), the temperature of the flue gas stream ranges from 200° C. to 400° C. during the flowing step. In some embodiments, such as embodiments where the at least one filter medium is in the form of or comprises a ceramic substrate (e.g., a ceramic candle), the temperature of the flue gas stream ranges from 250° C. to 350° C. during the flowing step.

In some embodiments, the flue gas stream comprises $NO_x$ compounds. In some embodiments, the $NO_x$ compounds comprise Nitric Oxide (NO) and Nitrogen Dioxide ($NO_2$). In some embodiments, the flue gas stream further comprises at least one of Oxygen ($O_2$), Water ($H_2O$), Nitrogen ($N_2$), Carbon Monoxide (CO), Sulfur Dioxide ($SO_2$), Sulfur Trioxide ($SO_3$), one or more hydrocarbons, or any combination thereof.

In some embodiments, the method of regenerating at least one filter medium comprises increasing $NO_x$ removal efficiency of the at least one filter medium. In some embodiments, this increase in $NO_x$ removal efficiency may occur as a result of removing ABS deposits, AS deposits, or any combination thereof.

In some embodiments, the increasing of the $NO_x$ removal efficiency of the at least one filter medium comprises increasing $NO_2$ concentration to a range from 2% to 99% of a total concentration of the $NO_x$ compounds. In some embodiments, the increasing of the $NO_x$ removal efficiency of the at least one filter medium comprises increasing $NO_2$ concentration to a range from 5% to 99% of a total concentration of the $NO_x$ compounds. In some embodiments, the increasing of the $NO_x$ removal efficiency of the at least one filter medium comprises increasing $NO_2$ concentration to a range from 10% to 99% of a total concentration of the $NO_x$ compounds. In some embodiments, the increasing of the $NO_x$ removal efficiency of the at least one filter medium comprises increasing $NO_2$ concentration to a range from 25% to 99% of a total concentration of the $NO_x$ compounds. In some embodiments, the increasing of the $NO_x$ removal efficiency of the at least one filter medium comprises increasing $NO_2$ concentration to a range from 50% to 99% of a total concentration of the $NO_x$ compounds. In some embodiments, the increasing of the $NO_x$ removal efficiency of the at least one filter medium comprises increasing $NO_2$ concentration to a range from 75% to 99% of a total concentration of the $NO_x$ compounds. In some embodiments, the increasing of the $NO_x$ removal efficiency of the at least one filter medium comprises increasing $NO_2$ concentration to a range from 95% to 99% of a total concentration of the $NO_x$ compounds.

In some embodiments, the increasing of the $NO_x$ removal efficiency of the at least one filter medium comprises increasing $NO_2$ concentration to a range from 2% to 95% of a total concentration of the $NO_x$ compounds. In some embodiments, the increasing of the $NO_x$ removal efficiency of the at least one filter medium comprises increasing $NO_2$ concentration to a range from 2% to 75% of a total concentration of the $NO_x$ compounds. In some embodiments, the increasing of the $NO_x$ removal efficiency of the at least one filter medium comprises increasing $NO_2$ concentration to a range from 2% to 50% of a total concentration of the $NO_x$ compounds. In some embodiments, the increasing of the $NO_x$ removal efficiency of the at least one filter medium comprises increasing $NO_2$ concentration to a range from 2% to 25% of a total concentration of the $NO_x$ compounds. In some embodiments, the increasing of the $NO_x$ removal efficiency of the at least one filter medium comprises increasing $NO_2$ concentration to a range from 2% to 10% of a total concentration of the $NO_x$ compounds. In some embodiments, the increasing of the $NO_x$ removal efficiency of the at least one filter medium comprises increasing $NO_2$ concentration to a range from 2% to 5% of a total concentration of the $NO_x$ compounds.

In some embodiments, the increasing of the $NO_x$ removal efficiency of the at least one filter medium comprises increasing $NO_2$ concentration to a range from 5% to 95% of a total concentration of the $NO_x$ compounds. In some embodiments, the increasing of the $NO_x$ removal efficiency of the at least one filter medium comprises increasing $NO_2$ concentration to a range from 10% to 75% of a total concentration of the $NO_x$ compounds. In some embodiments, the increasing of the $NO_x$ removal efficiency of the at least one filter medium comprises increasing $NO_2$ concentration to a range from 25% to 50% of a total concentration of the $NO_x$ compounds.

In some embodiments, the concentration of $NO_2$ is increased by introducing at least one oxidizing agent to the flue gas stream.

In some embodiments, the concentration of $NO_2$ is increased by introducing at least one oxidizing agent to the flue gas stream in an amount ranging from 0.001 wt % to 50 wt % based on a total weight of the flue gas stream. In some embodiments, the concentration of $NO_2$ is increased by introducing at least one oxidizing agent to the flue gas stream in an amount ranging from 0.01 wt % to 50 wt % based on a total weight of the flue gas stream. In some embodiments, the concentration of $NO_2$ is increased by introducing at least one oxidizing agent to the flue gas stream in an amount ranging from 0.1 wt % to 50 wt % based on a total weight of the flue gas stream. In some embodiments, the concentration of $NO_2$ is increased by introducing at least one oxidizing agent to the flue gas stream in an amount ranging from 1 wt % to 50 wt % based on a total weight of the flue gas stream. In some embodiments, the concentration of $NO_2$ is increased by introducing at least one oxidizing agent to the flue gas stream in an amount ranging from 10 wt % to 50 wt % based on a total weight of the flue gas stream. In some embodiments, the concentration of $NO_2$ is increased by introducing at least one oxidizing agent to the flue gas stream in an amount ranging from 20 wt % to 50 wt % based on a total weight of the flue gas stream. In some embodiments, the concentration of $NO_2$ is increased by introducing at least one oxidizing agent to the flue gas stream in an amount ranging from 30 wt % to 50 wt % based on a total weight of the flue gas stream. In some embodiments, the concentration of $NO_2$ is increased by introducing at least one oxidizing agent to the flue gas stream in an amount ranging from 40 wt % to 50 wt % based on a total weight of the flue gas stream.

In some embodiments, the concentration of $NO_2$ is increased by introducing at least one oxidizing agent to the flue gas stream in an amount ranging from 0.001 wt % to 40 wt % based on a total weight of the flue gas stream. In some embodiments, the concentration of $NO_2$ is increased by introducing at least one oxidizing agent to the flue gas stream in an amount ranging from 0.001 wt % to 30 wt % based on a total weight of the flue gas stream. In some embodiments, the concentration of $NO_2$ is increased by introducing at least one oxidizing agent to the flue gas stream in an amount ranging from 0.001 wt % to 20 wt % based on a total weight of the flue gas stream. In some embodiments, the concentration of $NO_2$ is increased by introducing at least one oxidizing agent to the flue gas stream in an amount ranging from 0.001 wt % to 10 wt % based on a total weight of the flue gas stream. In some embodiments, the concentration of $NO_2$ is increased by introducing at least one oxidizing agent to the flue gas stream in an amount ranging from 0.001 wt % to 1 wt % based on a total weight of the flue gas stream. In some embodiments, the concentration of $NO_2$ is increased by introducing at least one oxidizing agent to the flue gas stream in an amount ranging from 0.001 wt % to 0.1 wt % based on a total weight of the flue gas stream. In some embodiments, the concentration of $NO_2$ is increased by introducing at least one oxidizing agent to the flue gas stream in an amount ranging from 0.001 wt % to 0.01 wt % based on a total weight of the flue gas stream.

In some embodiments, the concentration of $NO_2$ is increased by introducing at least one oxidizing agent to the flue gas stream in an amount ranging from 0.01 wt % to 40 wt % based on a total weight of the flue gas stream. In some embodiments, the concentration of $NO_2$ is increased by introducing at least one oxidizing agent to the flue gas stream in an amount ranging from 0.1 wt % to 30 wt % based on a total weight of the flue gas stream. In some embodiments, the concentration of $NO_2$ is increased by introducing at least one oxidizing agent to the flue gas stream in an amount ranging from 1 wt % to 20 wt % based on a total weight of the flue gas stream.

In some embodiments, the at least one oxidizing agent comprises an organic peroxide, a metal peroxide, a peroxy-acid, or any combination thereof.

Examples of at least one organic peroxide that may be suitable for some embodiments of the present disclosure include, but are not limited to, acetyl acetone peroxide, acetyl benzoyl peroxide, tert-butyl hydroperoxide, di-(1-naphthoyl)peroxide, diacetyl peroxide, ethyl hydroperoxide, methyl ethyl ketone peroxide, methyl isobutyl ketone peroxide, or any combination thereof. Examples of at least one metal peroxide that may be suitable for some embodiments of the present disclosure include but are not limited to barium peroxide ($BaO_2$), sodium peroxide ($Na_2O_2$), or any combination thereof.

Examples of at least one peroxy-acid that may be suitable for some embodiments of the present disclosure include, but are not limited to, peroxymonosulfuric acid ($H_2SO_5$), peroxynitric acid ($HNO_4$), peroxymonophosphoric acid ($H_3PO_5$), or any combination thereof.

Further examples of at least one oxidizing agent that may be suitable for some embodiments of the present disclosure include, but are not limited to, sodium percarbonate ($Na_2H_3CO_6$), sodium perborate ($Na_2H_4B_2O_8$), potassium persulfate ($K_2S_2O_8$) potassium permanganate ($KMnO_4$) sodium hypochlorite (NaClO), calcium hypochlorite (Ca(ClO)), chlorine dioxide ($ClO_2$) potassium chlorate ($KClO_3$), sodium chlorate ($NaClO_3$), magnesium chlorate ($Mg(ClO_3)_2$) ammonium perchlorate ($NH_4ClO_4$), perchloric acid ($HClO_4$), potassium perchlorate ($KClO_4$), sodium perchlorate ($NaClO_4$), sodium chlorite ($NaClO_2$), lithium hypochlorite (LiOCl), calcium hypochlorite Ca(OCl)$_2$, barium hypochlorite Ba(ClO)$_2$, sodium hypochlorite (NaClO), sodium bismuthate (NaBiO$_3$), or any combination thereof.

In some embodiments, the at least one oxidizing agent is chosen from: hydrogen peroxide (H$_2$O$_2$), ozone (O$_3$), hydroxyl radical or any combination thereof. In some embodiments, the at least one oxidizing agent is selected from the group consisting of: H$_2$O$_2$, O$_3$, hydroxyl radical, and any combination thereof.

In some embodiments, the at least one oxidizing agent comprises, consists of, or consists essentially of H$_2$O$_2$.

In some embodiments, the H$_2$O$_2$ is introduced into the flue gas stream in a sufficient amount so as to oxidize at least some of the NO in the flue gas stream to NO$_2$. In some embodiments, the sufficient amount of H$_2$O$_2$ that is introduced into the flue gas stream is an amount sufficient to oxidize at least 10% of the NO concentration in the flue gas stream to NO$_2$. In some embodiments, the sufficient amount of H$_2$O$_2$ that is introduced into the flue gas stream is an amount sufficient to oxidize at least 20% of the NO concentration in the flue gas stream to NO$_2$. In some embodiments, the sufficient amount of H$_2$O$_2$ that is introduced into the flue gas stream is an amount sufficient to oxidize at least 30% of the NO concentration in the flue gas stream to NO$_2$. In some embodiments, the sufficient amount of H$_2$O$_2$ that is introduced into the flue gas stream is an amount sufficient to oxidize at least 40% of the NO concentration in the flue gas stream to NO$_2$. In some embodiments, the sufficient amount of H$_2$O$_2$ that is introduced into the flue gas stream is an amount sufficient to oxidize at least 50% of the NO concentration in the flue gas stream to NO$_2$. In some embodiments, the sufficient amount of H$_2$O$_2$ that is introduced into the flue gas stream is an amount sufficient to oxidize at least 60% of the NO concentration in the flue gas stream to NO$_2$. In some embodiments, the sufficient amount of H$_2$O$_2$ that is introduced into the flue gas stream is an amount sufficient to oxidize at least 70% of the NO concentration in the flue gas stream to NO$_2$. In some embodiments, the sufficient amount of H$_2$O$_2$ that is introduced into the flue gas stream is an amount sufficient to oxidize at least 80% of the NO concentration in the flue gas stream to NO$_2$. In some embodiments, the sufficient amount of H$_2$O$_2$ that is introduced into the flue gas stream is an amount sufficient to oxidize at least 90% of the NO concentration in the flue gas stream to NO$_2$. In some embodiments, the sufficient amount of H$_2$O$_2$ that is introduced into the flue gas stream is an amount sufficient to oxidize at least 95% of the NO concentration in the flue gas stream to NO$_2$. In some embodiments, the sufficient amount of H$_2$O$_2$ that is introduced into the flue gas stream is an amount sufficient to oxidize at least all of the NO concentration in the flue gas stream to NO$_2$.

In some embodiments, the sufficient amount of H$_2$O$_2$ that is introduced into the flue gas stream is an amount sufficient to oxidize 10% to 90% of the NO concentration in the flue gas stream to NO$_2$. In some embodiments, the sufficient amount of H$_2$O$_2$ that is introduced into the flue gas stream is an amount sufficient to oxidize 20% to 90% of the NO concentration in the flue gas stream to NO$_2$. In some embodiments, the sufficient amount of H$_2$O$_2$ that is introduced into the flue gas stream is an amount sufficient to oxidize 30% to 90% of the NO concentration in the flue gas stream to NO$_2$. In some embodiments, the sufficient amount of H$_2$O$_2$ that is introduced into the flue gas stream is an amount sufficient to oxidize 40% to 90% of the NO concentration in the flue gas stream to NO$_2$. In some embodiments, the sufficient amount of H$_2$O$_2$ that is introduced into the flue gas stream is an amount sufficient to oxidize 50% to 90% of the NO concentration in the flue gas stream to NO$_2$. In some embodiments, the sufficient amount of H$_2$O$_2$ that is introduced into the flue gas stream is an amount sufficient to oxidize 60% to 90% of the NO concentration in the flue gas stream to NO$_2$. In some embodiments, the sufficient amount of H$_2$O$_2$ that is introduced into the flue gas stream is an amount sufficient to oxidize 70% to 90% of the NO concentration in the flue gas stream to NO$_2$. In some embodiments, the sufficient amount of H$_2$O$_2$ that is introduced into the flue gas stream is an amount sufficient to oxidize 80% to 90% of the NO concentration in the flue gas stream to NO$_2$.

In some embodiments, the sufficient amount of H$_2$O$_2$ that is introduced into the flue gas stream is an amount sufficient to oxidize 10% to 80% of the NO concentration in the flue gas stream to NO$_2$. In some embodiments, the sufficient amount of H$_2$O$_2$ that is introduced into the flue gas stream is an amount sufficient to oxidize 20% to 70% of the NO concentration in the flue gas stream to NO$_2$. In some embodiments, the sufficient amount of H$_2$O$_2$ that is introduced into the flue gas stream is an amount sufficient to oxidize 30% to 60% of the NO concentration in the flue gas stream to NO$_2$. In some embodiments, the sufficient amount of H$_2$O$_2$ that is introduced into the flue gas stream is an amount sufficient to oxidize 30% to 50% of the NO concentration in the flue gas stream to NO$_2$. In some embodiments, the sufficient amount of H$_2$O$_2$ that is introduced into the flue gas stream is an amount sufficient to oxidize 40% to 50% of the NO concentration in the flue gas stream to NO$_2$.

In some embodiments, the sufficient amount of H$_2$O$_2$ that is introduced into the flue gas stream is 0.1 wt % H$_2$O$_2$ to 30 wt % H$_2$O$_2$ based on a total weight of the flue gas stream. In some embodiments, the sufficient amount of H$_2$O$_2$ that is introduced into the flue gas stream is 1 wt % H$_2$O$_2$ to 30 wt % H$_2$O$_2$ based on a total weight of the flue gas stream. In some embodiments, the sufficient amount of H$_2$O$_2$ that is introduced into the flue gas stream is 5 wt % H$_2$O$_2$ to 30 wt % H$_2$O$_2$ based on a total weight of the flue gas stream. In some embodiments, the sufficient amount of H$_2$O$_2$ that is introduced into the flue gas stream is 10 wt % H$_2$O$_2$ to 30 wt % H$_2$O$_2$ based on a total weight of the flue gas stream. In some embodiments, the sufficient amount of H$_2$O$_2$ that is introduced into the flue gas stream is 15 wt % H$_2$O$_2$ to 30 wt % H$_2$O$_2$ based on a total weight of the flue gas stream. In some embodiments, the sufficient amount of H$_2$O$_2$ that is introduced into the flue gas stream is 20 wt % H$_2$O$_2$ to 30 wt % H$_2$O$_2$ based on a total weight of the flue gas stream. In some embodiments, the sufficient amount of H$_2$O$_2$ that is introduced into the flue gas stream is 25 wt % H$_2$O$_2$ to 30 wt % H$_2$O$_2$ based on a total weight of the flue gas stream.

In some embodiments, the sufficient amount of H$_2$O$_2$ that is introduced into the flue gas stream is 0.1 wt % H$_2$O$_2$ to 25 wt % H$_2$O$_2$ based on a total weight of the flue gas stream. In some embodiments, the sufficient amount of H$_2$O$_2$ that is introduced into the flue gas stream is 0.1 wt % H$_2$O$_2$ to 20 wt % H$_2$O$_2$ based on a total weight of the flue gas stream. In some embodiments, the sufficient amount of H$_2$O$_2$ that is introduced into the flue gas stream is 0.1 wt % H$_2$O$_2$ to 15 wt % H$_2$O$_2$ based on a total weight of the flue gas stream. In some embodiments, the sufficient amount of H$_2$O$_2$ that is introduced into the flue gas stream is 0.1 wt % H$_2$O$_2$ to 10 wt % H$_2$O$_2$ based on a total weight of the flue gas stream. In some embodiments, the sufficient amount of H$_2$O$_2$ that is introduced into the flue gas stream is 0.1 wt % H$_2$O$_2$ to 5 wt % H$_2$O$_2$ based on a total weight of the flue gas stream. In some embodiments, the sufficient amount of H$_2$O$_2$ that is introduced into the flue gas stream is 0.1 wt % H$_2$O$_2$ to 1 wt % H$_2$O$_2$ based on a total weight of the flue gas stream.

In some embodiments, the sufficient amount of $H_2O_2$ that is introduced into the flue gas stream is 1 wt % $H_2O_2$ to 25 wt % $H_2O_2$ based on a total weight of the flue gas stream. In some embodiments, the sufficient amount of $H_2O_2$ that is introduced into the flue gas stream is 5 wt % $H_2O_2$ to 20 wt % $H_2O_2$ based on a total weight of the flue gas stream. In some embodiments, the sufficient amount of $H_2O_2$ that is introduced into the flue gas stream is 10 wt % $H_2O_2$ to 15 wt % $H_2O_2$ based on a total weight of the flue gas stream.

In some embodiments, the oxidation of at least some of the NO in the flue gas stream to $NO_2$ results in the $NO_2$ having an upstream concentration in a range from 2% to 99% of a total concentration of the $NO_x$ compounds. In some embodiments, the oxidation of at least some of the NO in the flue gas stream to $NO_2$ results in the $NO_2$ having an upstream concentration in a range from 10% to 99% of a total concentration of the $NO_x$ compounds. In some embodiments, the oxidation of at least some of the NO in the flue gas stream to $NO_2$ results in the $NO_2$ having an upstream concentration in a range from 25% to 99% of a total concentration of the $NO_x$ compounds. In some embodiments, the oxidation of at least some of the NO in the flue gas stream to $NO_2$ results in the $NO_2$ having an upstream concentration in a range from 50% to 99% of a total concentration of the $NO_x$ compounds. In some embodiments, the oxidation of at least some of the NO in the flue gas stream to $NO_2$ results in the $NO_2$ having an upstream concentration in a range from 75% to 99% of a total concentration of the $NO_x$ compounds. In some embodiments, the oxidation of at least some of the NO in the flue gas stream to $NO_2$ results in the $NO_2$ having an upstream concentration in a range from 90% to 99% of a total concentration of the $NO_x$ compounds.

In some embodiments, the oxidation of at least some of the NO in the flue gas stream to $NO_2$ results in the $NO_2$ having an upstream concentration in a range from 2% to 90% of a total concentration of the $NO_x$ compounds. In some embodiments, the oxidation of at least some of the NO in the flue gas stream to $NO_2$ results in the $NO_2$ having an upstream concentration in a range from 2% to 75% of a total concentration of the $NO_x$ compounds. In some embodiments, the oxidation of at least some of the NO in the flue gas stream to $NO_2$ results in the $NO_2$ having an upstream concentration in a range from 2% to 50% of a total concentration of the $NO_x$ compounds. In some embodiments, the oxidation of at least some of the NO in the flue gas stream to $NO_2$ results in the $NO_2$ having an upstream concentration in a range from 2% to 25% of a total concentration of the $NO_x$ compounds. In some embodiments, the oxidation of at least some of the NO in the flue gas stream to $NO_2$ results in the $NO_2$ having an upstream concentration in a range from 2% to 10% of a total concentration of the $NO_x$ compounds.

In some embodiments, the oxidation of at least some of the NO in the flue gas stream to $NO_2$ results in the $NO_2$ having an upstream concentration in a range from 10% to 90% of a total concentration of the $NO_x$ compounds. In some embodiments, the oxidation of at least some of the NO in the flue gas stream to $NO_2$ results in the $NO_2$ having an upstream concentration in a range from 10% to 75% of a total concentration of the $NO_x$ compounds. In some embodiments, the oxidation of at least some of the NO in the flue gas stream to $NO_2$ results in the $NO_2$ having an upstream concentration in a range from 25% to 50% of a total concentration of the $NO_x$ compounds.

In some embodiments, the concentration of $NO_2$ is increased by introducing additional $NO_2$ into the flue gas stream. In some embodiments, at least some of the additional $NO_2$ is introduced by oxidizing at least some of the NO in the flue gas stream to $NO_2$ with the at least one oxidizing agent described herein. In some embodiments, the additional $NO_2$ is introduced directly into the flue gas stream, e.g., by at least one gas injection system. In some embodiments, additional $NO_2$ may be introduced by a combination of direct introduction and oxidization. In some embodiments, introducing additional $NO_2$ comprises removing at least some of the NO in the flue gas stream from the flue gas stream, oxidizing the NO to $NO_2$, and reintroducing at least some of the resulting $NO_2$ into the flue gas stream. In some embodiments, the resulting $NO_2$ may be reintroduced into the flue gas stream as a gas mixture comprising NO and $NO_2$.

In some embodiments, the increasing of the $NO_x$ removal efficiency of the at least one filter medium further comprises adding ammonia ($NH_3$). In some embodiments, cleaning a flue gas stream (as described herein, infra) comprises adding $NH_3$. In some embodiments, a combination of cleaning the flue gas stream and regenerating the at least one filter medium comprises adding $NH_3$.

In some embodiments, $NH_3$ is added in a concentration ranging from 0.0001% to 0.5% of the concentration of the flue gas stream. In some embodiments, $NH_3$ is added in a concentration ranging from 0.001% to 0.5% of the concentration of the flue gas stream. In some embodiments, $NH_3$ is added in a concentration ranging from 0.01% to 0.5% of the concentration of the flue gas stream. In some embodiments, $NH_3$ is added in a concentration ranging from 0.1% to 0.5% of the concentration of the flue gas stream.

In some embodiments, $NH_3$ is added in a concentration ranging from 0.0001% to 0.1% of the concentration of the flue gas stream. In some embodiments, $NH_3$ is added in a concentration ranging from 0.0001% to 0.05% of the concentration of the flue gas stream. In some embodiments, $NH_3$ is added in a concentration ranging from 0.0001% to 0.005% of the concentration of the flue gas stream.

In some embodiments, $NH_3$ is added in a concentration ranging from 0.005% to 0.1% of the concentration of the flue gas stream. In some embodiments, $NH_3$ is added in a concentration ranging from 0.005% to 0.05% of the concentration of the flue gas stream.

In some embodiments, the $NO_x$ removal efficiency of the at least one filter medium is at least 0.5% higher after the increasing step than during the providing step. In some embodiments, the $NO_x$ removal efficiency of the at least one filter medium is at least 1% higher after the increasing step than during the providing step. In some embodiments, the $NO_x$ removal efficiency of the at least one filter medium is at least 5% higher after the increasing step than during the providing step. In some embodiments, the $NO_x$ removal efficiency of the at least one filter medium is at least 10% higher after the increasing step than during the providing step. In some embodiments, the $NO_x$ removal efficiency of the at least one filter medium is at least 25% higher after the increasing step than during the providing step. In some embodiments, the $NO_x$ removal efficiency of the at least one filter medium is at least 50% higher after the increasing step than during the providing step. In some embodiments, the $NO_x$ removal efficiency of the at least one filter medium is at least 75% higher after the increasing step than during the providing step. In some embodiments, the $NO_x$ removal efficiency of the at least one filter medium is at least 100% higher after the increasing step than during the providing step.

In some embodiments, the increasing of the $NO_x$ removal efficiency comprises removing at least some of the ABS deposits, the AS deposits, or any combination thereof, from the at least one filter medium. In some embodiments, removing at least some of the ABS deposits, the AS deposits, or any combination thereof, from the at least one filter medium may regenerate the at least one filter medium, as described herein.

In some embodiments, the increasing of the $NO_x$ removal efficiency comprises removing at least 10% of the ABS deposits, the AS deposits, or any combination thereof, from the at least one filter medium. In some embodiments, the increasing of the $NO_x$ removal efficiency comprises removing at least 25% of the ABS deposits, the AS deposits, or any combination thereof, from the at least one filter medium. In some embodiments, the increasing of the $NO_x$ removal efficiency comprises removing at least 50% of the ABS deposits, the AS deposits, or any combination thereof, from the at least one filter medium. In some embodiments, the increasing of the $NO_x$ removal efficiency comprises removing at least 75% of the ABS deposits, the AS deposits, or any combination thereof, from the at least one filter medium. In some embodiments, the increasing of the $NO_x$ removal efficiency comprises removing at least 95% of the ABS deposits, the AS deposits, or any combination thereof, from the at least one filter medium. In some embodiments, the increasing of the $NO_x$ removal efficiency comprises removing all of the ABS deposits, the AS deposits, or any combination thereof, from the at least one filter medium.

In some embodiments, after the step of increasing the $NO_x$ removal efficiency, ABS deposits are disposed on the catalyst material of the at least one filter medium in a concentration ranging from 0.01% to 98% by mass of the at least one filter medium. In some embodiments after the step of increasing the $NO_x$ removal efficiency, ABS deposits are disposed on the catalyst material of the at least one filter medium in a concentration ranging from 0.01% to 90% by mass of the at least one filter medium. In some embodiments, after the step of increasing the $NO_x$ removal efficiency, ABS deposits are disposed on the catalyst material of the at least one filter medium in a concentration ranging from 0.01% to 50% by mass of the at least one filter medium. In some embodiments, after the step of increasing the $NO_x$ removal efficiency, ABS deposits are disposed on the catalyst material of the at least one filter medium in a concentration ranging from 0.01% to 20% by mass of the at least one filter medium. In some embodiments, after the step of increasing the $NO_x$ removal efficiency, ABS deposits are disposed on the catalyst material of the at least one filter medium in a concentration ranging from 0.01% to 10% by mass of the at least one filter medium. In some embodiments, after the step of increasing the $NO_x$ removal efficiency, ABS deposits are disposed on the catalyst material of the at least one filter medium in a concentration ranging from 0.01% to 5% by mass of the at least one filter medium. In some embodiments, after the step of increasing the $NO_x$ removal efficiency, ABS deposits are disposed on the catalyst material of the at least one filter medium in a concentration ranging from 0.01% to 1% by mass of the at least one filter medium. In some embodiments, after the step of increasing the $NO_x$ removal efficiency, ABS deposits are disposed on the catalyst material of the at least one filter medium in a concentration ranging from 0.01% to 0.1% by mass of the at least one filter medium.

In some embodiments, after the step of increasing the $NO_x$ removal efficiency, ABS deposits are disposed on the catalyst material of the at least one filter medium in a concentration ranging from 0.1% to 98% by mass of the at least one filter medium. In some embodiments, after the step of increasing the $NO_x$ removal efficiency, ABS deposits are disposed on the catalyst material of the at least one filter medium in a concentration ranging from 1% to 98% by mass of the at least one filter medium. In some embodiments, after the step of increasing the $NO_x$ removal efficiency, ABS deposits are disposed on the catalyst material of the at least one filter medium in a concentration ranging from 5% to 98% by mass of the at least one filter medium. In some embodiments, after the step of increasing the $NO_x$ removal efficiency, ABS deposits are disposed on the catalyst material of the at least one filter medium in a concentration ranging from 10% to 98% by mass of the at least one filter medium. In some embodiments, after the step of increasing the $NO_x$ removal efficiency, ABS deposits are disposed on the catalyst material of the at least one filter medium in a concentration ranging from 20% to 98% by mass of the at least one filter medium. In some embodiments, after the step of increasing the $NO_x$ removal efficiency, ABS deposits are disposed on the catalyst material of the at least one filter medium in a concentration ranging from 50% to 98% by mass of the at least one filter medium. In some embodiments after the step of increasing the $NO_x$ removal efficiency, ABS deposits are disposed on the catalyst material of the at least one filter medium in a concentration ranging from 90% to 98% by mass of the at least one filter medium.

In some embodiments, after the increasing step, ABS deposits are disposed on the catalyst material of the at least one filter medium in a concentration ranging from 0.1% to 90% by mass of the at least one filter medium. In some embodiments, after the step of increasing the $NO_x$ removal efficiency, ABS deposits are disposed on the catalyst material of the at least one filter medium in a concentration ranging from 1% to 50% by mass of the at least one filter medium. In some embodiments, after the step of increasing the $NO_x$ removal efficiency, ABS deposits are disposed on the catalyst material of the at least one filter medium in a concentration ranging from 5% to 20% by mass of the at least one filter medium.

Some embodiments of the present disclosure relate to a method of cleaning a flue gas stream. As used herein, "cleaning a flue gas stream" means that after "cleaning a flue gas stream" at least one component (such as, but not limited to, NO, $NO_2$, or a combination thereof) of the flue gas stream is present at a lower concentration as compared to a concentration of the at least one component prior to "cleaning the flue gas stream." As described herein, "cleaning a flue gas stream" is not necessarily mutually exclusive with "regenerating at least one filter medium" because, in some embodiments, at least one filter medium, prior to regeneration, may still "clean a flue gas stream," at a lower efficiency as compared to the "at least one filter medium," after regeneration.

In some embodiments, at least one filter medium may be regenerated during the cleaning of the flue gas stream. In some embodiments, at least one filter medium may be regenerated before the cleaning of the flue gas stream. In some embodiments, at least one filter medium may be regenerated after the cleaning of the flue gas stream. In some embodiments, a method may comprise switching between configurations of "cleaning a flue gas stream" and "regenerating at least one filter medium." In some embodiments, at least one step, component, or combination thereof from a method of "cleaning a flue gas stream" may be used in a method of "regenerating at least one filter medium" or vice versa.

In some embodiments, the method of cleaning the flue gas stream may comprise flowing a flue gas stream through a filter medium as described herein, (i.e., transverse to a cross-section of a filter medium, such that the flue gas stream passes through the cross section of the at least one filter medium).

In some embodiments of the method of cleaning the flue gas stream, the flue gas stream may comprise $NO_x$ compounds. In some embodiments, the $NO_x$ compounds may comprise Nitric Oxide (NO), and Nitrogen Dioxide ($NO_2$). In some embodiments, the flue gas stream may further comprise Sulfur Dioxide ($SO_2$) and Ammonia ($NH_3$).

In some embodiments, the $SO_2$, $NH_3$, and $NO_x$ compounds are present in an amount of at least 1 mg/m$^3$ based on a total volume of the flue gas stream. In some embodiments, the $SO_2$, $NH_3$, and $NO_x$ compounds are present in an amount of at least 2 mg/m$^3$ based on a total volume of the flue gas stream. In some embodiments, the $SO_2$, $NH_3$, and $NO_x$ compounds are present in an amount of at least 5 mg/m$^3$ based on a total volume of the flue gas stream. In some embodiments, the $SO_2$, $NH_3$, and $NO_x$ compounds are present in an amount of at least 10 mg/m$^3$ based on a total volume of the flue gas stream. In some embodiments, the $SO_2$, $NH_3$, and $NO_x$ compounds are present in an amount of at least 25 mg/m$^3$ based on a total volume of the flue gas stream. In some embodiments, the $SO_2$, $NH_3$, and $NO_x$ compounds are present in an amount of at least 50 mg/m$^3$ based on a total volume of the flue gas stream. In some embodiments, the $SO_2$, $NH_3$, and $NO_x$ compounds are present in an amount of at least 100 mg/m$^3$ based on a total volume of the flue gas stream.

In some embodiments of the method of cleaning the flue gas stream, the method may include maintaining a constant $NO_x$ removal efficiency of the at least one filter medium. As used herein "a constant $NO_x$ removal efficiency" means that a $NO_x$ removal efficiency of the at least one filter medium does not vary by more than a predetermined amount.

In some embodiments of the method of cleaning the flue gas stream, the method may include maintaining $NO_x$ removal efficiency of the at least one filter medium that does not vary by more than ±0.1%. In some embodiments of the method of cleaning the flue gas stream, the method may include maintaining $NO_x$ removal efficiency of the at least one filter medium that does not vary by more than ±0.5%. In some embodiments of the method of cleaning the flue gas stream, the method may include maintaining $NO_x$ removal efficiency of the at least one filter medium that does not vary by more than ±1%. In some embodiments of the method of cleaning the flue gas stream, the method may include maintaining $NO_x$ removal efficiency of the at least one filter medium that does not vary by more than ±2%. In some embodiments of the method of cleaning the flue gas stream, the method may include maintaining $NO_x$ removal efficiency of the at least one filter medium that does not vary by more than ±3%. In some embodiments of the method of cleaning the flue gas stream, the method may include maintaining $NO_x$ removal efficiency of the at least one filter medium that does not vary by more than ±4%. In some embodiments of the method of cleaning the flue gas stream, the method may include maintaining $NO_x$ removal efficiency of the at least one filter medium that does not vary by more than ±5%.

In some embodiments, maintaining a constant $NO_x$ removal efficiency of the at least one filter medium comprises providing an $NO_2$ concentration, measured from the upstream side of the filter medium, in a range from 2% to 99% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 5% to 99% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 10% to 99% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 25% to 99% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 50% to 99% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 75% to 99% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 95% to 99% of a total concentration of the $NO_x$ compounds.

In some embodiments, maintaining a constant $NO_x$ removal efficiency of the at least one filter medium comprises providing an $NO_2$ concentration, measured from the upstream side of the filter medium, in a range from 2% to 95% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 2% to 75% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 2% to 50% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 2% to 25% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 2% to 10% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 2% to 5% of a total concentration of the $NO_x$ compounds.

In some embodiments, maintaining a constant $NO_x$ removal efficiency of the at least one filter medium comprises providing an $NO_2$ concentration, measured from the upstream side of the filter medium, in a range from 5% to 95% of a total concentration of the $NO_x$ compounds. In some embodiments, maintaining a constant $NO_x$ removal efficiency of the at least one filter medium comprises providing an $NO_2$ concentration, measured from the upstream side of the filter medium in a range from 10% to 75% of a total concentration of the $NO_x$ compounds. In some embodiments, maintaining a constant $NO_x$ removal efficiency of the at least one filter medium comprises providing an $NO_2$ concentration, measured from the upstream side of the filter medium, in a range from 25% to 50% of a total concentration of the $NO_x$ compounds.

In some embodiments, maintaining a constant $NO_x$ removal efficiency of the at least one filter medium may include controlling an $NO_2$ concentration, measured from the downstream side of the filter medium, to a range of from 0.0001% to 0.5% of the concentration of the flue gas stream. In some embodiments, maintaining a constant $NO_x$ removal efficiency of the at least one filter medium may include controlling an $NO_2$ concentration, measured from the downstream side of the filter medium, to a range of from 0.001% to 0.5% of the concentration of the flue gas stream. In some embodiments, maintaining a constant $NO_x$ removal efficiency of the at least one filter medium may include controlling an $NO_2$ concentration, measured from the downstream side of the filter medium, to a range of from 0.01% to 0.5% of the concentration of the flue gas stream. In some embodiments, maintaining a constant $NO_x$ removal efficiency of the at least one filter medium may include controlling an $NO_2$ concentration, measured from the downstream side of the filter medium, to a range of from 0.1% to 0.5% of the concentration of the flue gas stream.

In some embodiments, maintaining a constant $NO_x$ removal efficiency of the at least one filter medium may include controlling an $NO_2$ concentration, measured from the downstream side of the filter medium, to a range of from 0.0001% to 0.1% of the concentration of the flue gas stream. In some embodiments, maintaining a constant $NO_x$ removal efficiency of the at least one filter medium may include controlling an $NO_2$ concentration, measured from the downstream side of the filter medium, to a range of from 0.0001% to 0.01% of the concentration of the flue gas stream. In some embodiments, maintaining a constant $NO_x$ removal efficiency of the at least one filter medium may include controlling an $NO_2$ concentration, measured from the downstream side of the filter medium, to a range of from 0.0001% to 0.001% of the concentration of the flue gas stream.

In some embodiments, maintaining a constant $NO_x$ removal efficiency of the at least one filter medium may include controlling an $NO_2$ concentration, measured from the downstream side of the filter medium, to a range of from 0.001% to 0.1% of the concentration of the flue gas stream. In some embodiments, maintaining a constant $NO_x$ removal efficiency of the at least one filter medium may include controlling an $NO_2$ concentration, measured from the downstream side of the filter medium, to a range of from 0.01% to 0.1% of the concentration of the flue gas stream.

In some embodiments $NO_x$ efficiency is maintained in an amount of at least 70% of an initial $NO_x$ efficiency. In some embodiments $NO_x$ efficiency is maintained in an amount of at least 75% of an initial $NO_x$ efficiency. In some embodiments $NO_x$ efficiency is maintained in an amount of at least 80% of an initial $NO_x$ efficiency. In some embodiments $NO_x$ efficiency is maintained in an amount of at least 85% of an initial $NO_x$ efficiency. In some embodiments $NO_x$ efficiency is maintained in an amount of at least 90% of an initial $NO_x$ efficiency. In some embodiments $NO_x$ efficiency is maintained in an amount of at least 95% of an initial $NO_x$ efficiency. In some embodiments $NO_x$ efficiency is maintained in an amount of at least 99% of an initial $NO_x$ efficiency.

In some embodiments, the $NO_x$ removal efficiency of the at least one filter medium is maintained in a range of 70% to 99% of the initial $NO_x$ efficiency. In some embodiments, the $NO_x$ removal efficiency of the at least one filter medium is maintained in a range of 75% to 99% of the initial $NO_x$ efficiency. In some embodiments, the $NO_x$ removal efficiency of the at least one filter medium is maintained in a range of 80% to 99% of the initial $NO_x$ efficiency. In some embodiments, the $NO_x$ removal efficiency of the at least one filter medium is maintained in a range of 85% to 99% of the initial $NO_x$ efficiency. In some embodiments, the $NO_x$ removal efficiency of the at least one filter medium is maintained in a range of 90% to 99% of the initial $NO_x$ efficiency. In some embodiments, the $NO_x$ removal efficiency of the at least one filter medium is maintained in a range of 95% to 99% of the initial $NO_x$ efficiency.

In some embodiments, the $NO_x$ removal efficiency of the at least one filter medium is maintained in a range of 70% to 95% of the initial $NO_x$ efficiency. In some embodiments, the $NO_x$ removal efficiency of the at least one filter medium is maintained in a range of 70% to 90% of the initial $NO_x$ efficiency. In some embodiments, the $NO_x$ removal efficiency of the at least one filter medium is maintained in a range of 70% to 85% of the initial $NO_x$ efficiency. In some embodiments, the $NO_x$ removal efficiency of the at least one filter medium is maintained in a range of 70% to 80% of the initial $NO_x$ efficiency. In some embodiments, the $NO_x$ removal efficiency of the at least one filter medium is maintained in a range of 70% to 75% of the initial $NO_x$ efficiency.

In some embodiments, the $NO_x$ removal efficiency of the at least one filter medium is maintained in a range of 75% to 95% of the initial $NO_x$ efficiency. In some embodiments, the $NO_x$ removal efficiency of the at least one filter medium is maintained in a range of 80% to 90% of the initial $NO_x$ efficiency.

In some embodiments, $NO_x$ efficiency is maintained by increasing $NO_2$. In some embodiments, $NO_2$ is increased periodically. In some embodiments, $NO_2$ is increased continuously. In some embodiments, the periodic addition of $NO_2$ occurs at constant time intervals. In some embodiments, the periodic addition of $NO_2$ occurs at variable time intervals. In some embodiments, the periodic addition of $NO_2$ occurs at random time intervals.

In some embodiments, the periodic addition of $NO_2$ comprises increasing $NO_2$ every 1 to 40,000 hours. In some embodiments, the periodic addition of $NO_2$ comprises increasing $NO_2$ every 10 to 40,000 hours. In some embodiments, the periodic addition of $NO_2$ comprises increasing $NO_2$ every 100 to 40,000 hours. In some embodiments, the periodic addition of $NO_2$ comprises increasing $NO_2$ every 1,000 to 40,000 hours. In some embodiments, the periodic addition of $NO_2$ comprises increasing $NO_2$ every 5,000 to 40,000 hours. In some embodiments, the periodic addition of $NO_2$ comprises increasing $NO_2$ every 10,000 to 40,000 hours. In some embodiments, the periodic addition of $NO_2$ comprises increasing $NO_2$ every 20,000 to 40,000 hours. In some embodiments, the periodic addition of $NO_2$ comprises increasing $NO_2$ every 30,000 to 40,000 hours.

In some embodiments, the periodic addition of $NO_2$ comprises increasing $NO_2$ every 1 to 30,000 hours. In some embodiments, the periodic addition of $NO_2$ comprises increasing $NO_2$ every 1 to 20,000 hours. In some embodiments, the periodic addition of $NO_2$ comprises increasing $NO_2$ every 1 to 10,000 hours. In some embodiments, the periodic addition of $NO_2$ comprises increasing $NO_2$ every 1 to 5,000 hours. In some embodiments, the periodic addition of $NO_2$ comprises increasing $NO_2$ every 1 to 1,000 hours. In some embodiments, the periodic addition of $NO_2$ comprises increasing $NO_2$ every 1 to 100 hours. In some embodiments, the periodic addition of $NO_2$ comprises increasing $NO_2$ every 1 to 10 hours.

In some embodiments, the periodic addition of $NO_2$ comprises increasing $NO_2$ every 10 to 30,000 hours. In some embodiments, the periodic addition of $NO_2$ comprises increasing $NO_2$ every 100 to 20,000 hours. In some embodiments, the periodic addition of $NO_2$ comprises increasing $NO_2$ every 1,000 to 5,000 hours.

In some embodiments, the continuous addition of the $NO_2$ comprises providing $NO_2$ at a flow rate of 2% to 99% of a total flow rate of the upstream $NO_x$ compounds. In some embodiments, the continuous addition of the $NO_2$ comprises providing $NO_2$ at a flow rate of 5% to 99% of a total flow rate of the upstream $NO_x$ compounds. In some embodiments, the continuous addition of the $NO_2$ comprises providing $NO_2$ at a flow rate of 10% to 99% of a total flow rate of the upstream $NO_x$ compounds. In some embodiments, the continuous addition of the $NO_2$ comprises providing $NO_2$ at a flow rate of 20% to 99% of a total flow rate of the upstream $NO_x$ compounds. In some embodiments, the continuous addition of the $NO_2$ comprises providing $NO_2$ at a flow rate of 30% to 99% of a total flow rate of the upstream $NO_x$ compounds. In some embodiments, the continuous addition of the $NO_2$ comprises providing $NO_2$ at a flow rate of 40% to 99% of a total flow rate of the upstream $NO_x$ compounds. In some embodiments, the continuous addition of the $NO_2$ comprises providing $NO_2$ at a flow rate of 50% to 99% of a total flow rate of the upstream $NO_x$ compounds. In some embodiments, the continuous addition of the $NO_2$ comprises providing $NO_2$ at a flow rate of 60% to 99% of a total flow rate of the upstream $NO_x$ compounds. In some embodiments, the continuous addition of the $NO_2$ comprises providing $NO_2$ at a flow rate of 70% to 99% of a total flow rate of the upstream $NO_x$ compounds. In some embodiments, the continuous addition of the $NO_2$ comprises providing $NO_2$ at a flow rate of 80% to 99% of a total flow rate of the upstream $NO_x$ compounds. In some embodiments, the continuous addition of the $NO_2$ comprises providing $NO_2$ at a flow rate of 95% to 99% of a total flow rate of the upstream $NO_x$ compounds.

In some embodiments, the continuous addition of the $NO_2$ comprises providing $NO_2$ at a flow rate of 2% to 95% of a total flow rate of the upstream $NO_x$ compounds. In some embodiments, the continuous addition of the $NO_2$ comprises providing $NO_2$ at a flow rate of 2% to 90% of a total flow rate of the upstream $NO_x$ compounds. In some embodiments, the continuous addition of the $NO_2$ comprises providing $NO_2$ at a flow rate of 2% to 80% of a total flow rate of the upstream $NO_x$ compounds. In some embodiments, the continuous addition of the $NO_2$ comprises providing $NO_2$ at a flow rate of 2% to 70% of a total flow rate of the upstream $NO_x$ compounds. In some embodiments, the continuous addition of the $NO_2$ comprises providing $NO_2$ at a flow rate of 2% to 60% of a total flow rate of the upstream $NO_x$ compounds. In some embodiments, the continuous addition of the $NO_2$ comprises providing $NO_2$ at a flow rate of 2% to 50% of a total flow rate of the upstream $NO_x$ compounds. In some embodiments, the continuous addition of the $NO_2$ comprises providing $NO_2$ at a flow rate of 2% to 40% of a total flow rate of the upstream $NO_x$ compounds. In some embodiments, the continuous addition of the $NO_2$ comprises providing $NO_2$ at a flow rate of 2% to 30% of a total flow rate of the upstream $NO_x$ compounds. In some embodiments, the continuous addition of the $NO_2$ comprises providing $NO_2$ at a flow rate of 2% to 20% of a total flow rate of the upstream $NO_x$ compounds. In some embodiments, the continuous addition of the $NO_2$ comprises providing $NO_2$ at a flow rate of 2% to 10% of a total flow rate of the upstream $NO_x$ compounds. In some embodiments, the continuous addition of the $NO_2$ comprises providing $NO_2$ at a flow rate of 2% to 5% of a total flow rate of the upstream $NO_x$ compounds.

In some embodiments, the continuous addition of the $NO_2$ comprises providing $NO_2$ at a flow rate of 5% to 95% of a total flow rate of the upstream $NO_x$ compounds. In some embodiments, the continuous addition of the $NO_2$ comprises providing $NO_2$ at a flow rate of 10% to 90% of a total flow rate of the upstream $NO_x$ compounds. In some embodiments, the continuous addition of the $NO_2$ comprises providing $NO_2$ at a flow rate of 20% to 80% of a total flow rate of the upstream $NO_x$ compounds. In some embodiments, the continuous addition of the $NO_2$ comprises providing $NO_2$ at a flow rate of 30% to 70% of a total flow rate of the upstream $NO_x$ compounds. In some embodiments, the continuous addition of the $NO_2$ comprises providing $NO_2$ at a flow rate of 40% to 60% of a total flow rate of the upstream $NO_x$ compounds.

FIGS. 1A-1D depict embodiments of an exemplary filter medium according to the present disclosure.

Referring to FIG. 1A, at least one filter medium 101 may be housed in at least one filter bag 100. A flue gas stream 102 may flow through the at least one filter medium 101 by passing through cross section A. Once the flue gas stream 102 flows through the at least one filter medium 101, the flue gas stream 102 may flow by the at least one filter bag, as indicated by the vertically oriented arrows.

Figure 1B:
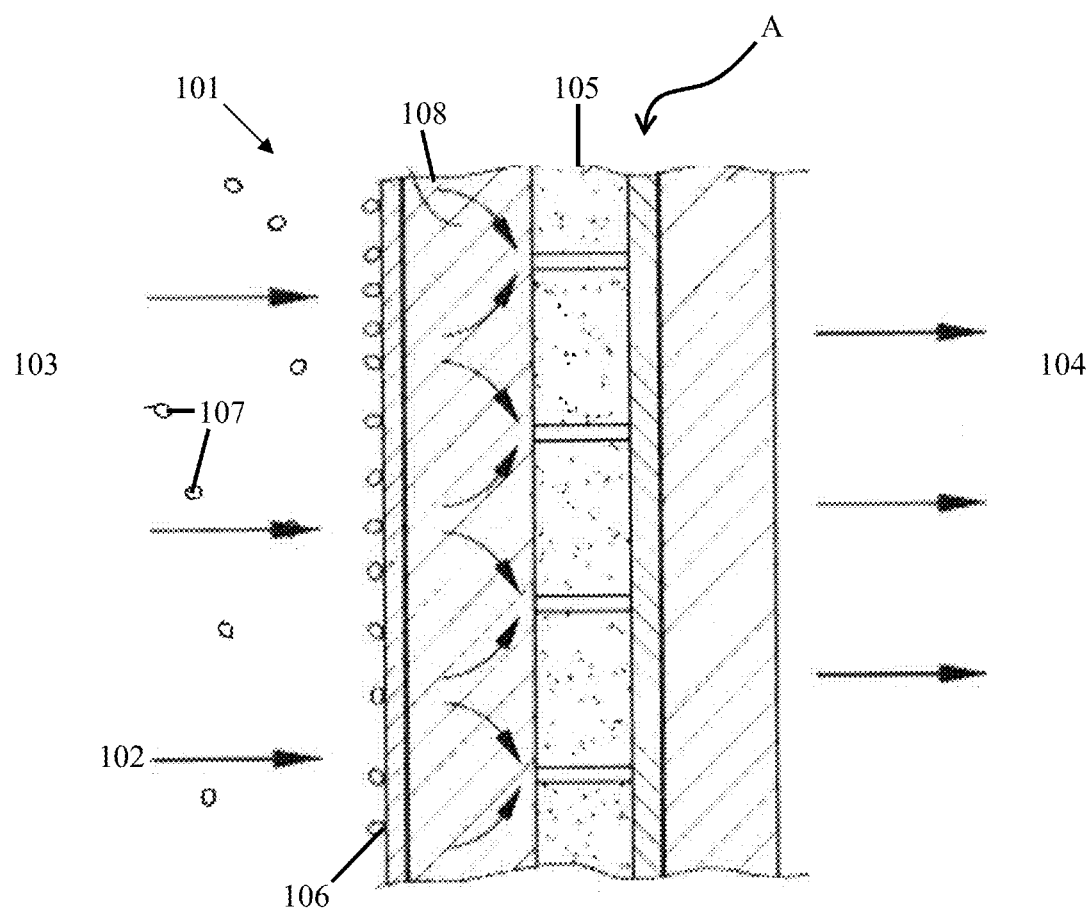

FIG. 1B depicts an exemplary filter medium 101 according to some embodiments of the present disclosure. As shown in FIG. 1B, a flue gas stream 102, which may comprise $NO_x$ compounds and solid particulates 107, may flow through cross section A from an upstream side 103 of the filter medium 101 to a downstream side 104 of the filter medium. While not shown, the upstream side 103 of the filter medium 101 may, in some embodiments, correspond to an outside of a filter bag, such as filter bag 100. Likewise, downstream side 104 of the filter medium 101 may correspond to an inside of a filter bag, such as filter bag 100. In some embodiments, filter medium 101 may include at least one protective membrane 106 and one or more felt batts 108 on at least one of: the upstream side 103 the of the filter medium 101, the downstream side 104 the of the filter medium 101, or any combination thereof. In some embodiments, the one or more felt batts 108 may be positioned on a porous catalytic film 105. In some embodiments, the combination of the one or more felt batts 108 and the porous catalytic film 105 may be referred to as a porous catalytic layer (not shown in FIG. 1B).

Figure 1C:
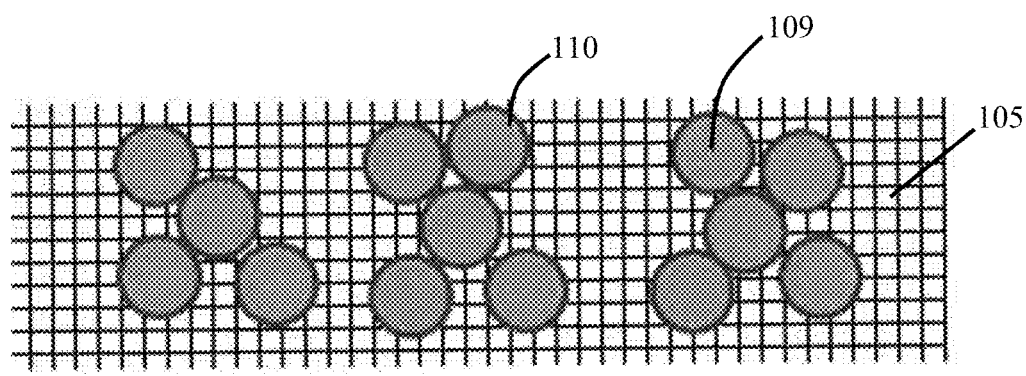

FIG. 1C depicts a non-limiting exemplary embodiment of the porous catalytic film 105. As shown, porous catalytic film 105 may include catalyst particles 109 on at least one surface of the porous catalytic film 105. ABS deposits 110 may be disposed on the surface of the catalyst particles 109.

Figure 1D:
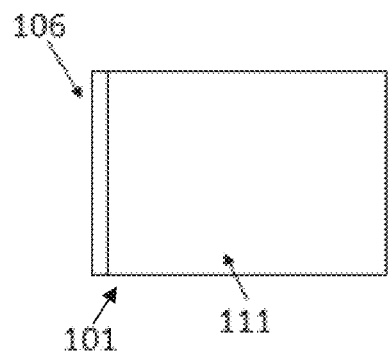

FIG. 1D depicts an additional non-limiting exemplary embodiment of a filter medium 101. As shown, filter medium 101 may comprise a porous catalytic layer 111. In some non-limiting embodiments, filter medium 101 may take the form of a filter bag. In some embodiments the porous catalytic layer 111 may be coated with a catalyst material (not shown in FIG. 1D) such as catalyst particles. In some embodiments, the catalyst material may be attached to the porous catalytic layer 111 by one or more adhesives described herein (not shown). In some embodiments, the filter medium 101 may include a porous protective membrane 106.

At least some non-limiting aspects of the present disclosure will now be described with reference to the following numbered embodiments hereinafter designated as [E1, E2, E3, E4 . . . ]:

E1. A method comprising:
  providing at least one filter medium;
    wherein the at least one filter medium comprises:
      at least one catalyst material; and
      ammonium bisulfate (ABS) deposits, ammonium sulfate (AS) deposits, or any combination thereof;
  flowing a flue gas stream transverse to a cross-section of the at least one filter medium, such that the flue gas stream passes through the cross section of the at least one filter medium;
    wherein the flue gas stream comprises:
      $NO_x$ compounds comprising:
        Nitric Oxide (NO), and
        Nitrogen Dioxide ($NO_2$); and
  increasing $NO_x$ removal efficiency of the at least one filter medium;
    wherein the increasing of the $NO_x$ removal efficiency of the at least one filter medium comprises increasing an upstream $NO_2$ concentration to a range from 2% to 99% of a total concentration of the upstream $NO_x$ compounds,
wherein the method regenerates the at least one filter medium.

E2. A method comprising:
  providing at least one filter medium;
    wherein the at least one filter medium comprises:
      at least one catalyst material; and
      ammonium bisulfate (ABS), ammonium sulfate (AS), or any combination thereof;
  flowing a flue gas stream through or by the at least one filter medium;
    wherein the flue gas stream comprises:
      $NO_x$ compounds comprising:
        Nitric Oxide (NO), and
        Nitrogen Dioxide ($NO_2$);
  increasing $NO_x$ removal efficiency of the at least one filter medium;
    wherein the increasing of the $NO_x$ removal efficiency of the at least one filter medium comprises increasing an upstream $NO_2$ concentration to a range from 2% to 99% of a total concentration of the upstream $NO_x$ compounds;
    wherein the increasing of the $NO_x$ removal efficiency of the at least one filter medium further comprises adding ammonia ($NH_3$) in a concentration ranging from 0.0001% to 0.5% of the concentration of the flue gas stream;
wherein the method regenerates the at least one filter medium.

E3. The method of any of the preceding embodiments or any combination thereof, wherein the temperature of the flue gas stream ranges from 160° C. to 280° C. during the flowing step.

E4. The method of any of the preceding embodiments, or any combination thereof, wherein the flue gas stream further comprises at least one of Oxygen ($O_2$), Water ($H_2O$), Nitrogen ($N_2$), Carbon Monoxide (CO), Sulfur Dioxide ($SO_2$), Sulfur Trioxide ($SO_3$), one or more hydrocarbons, or any combination thereof.

E5. The method of embodiment 2, wherein the flue gas stream is flowed transverse to a cross-section of the at least one filter medium, such that the flue gas stream passes through the cross section of the at least one filter medium.

E6. The method of embodiment 2, wherein the flue gas stream is not flowed transverse to a cross-section of the at least one filter medium, such that the flue gas stream does not pass through the cross section of the at least one filter medium.

E7. The method of embodiment 1, 3-5, or any combination thereof, wherein the flue gas stream is flowed perpendicular to a cross-section of the at least one filter medium.

E8. The method of embodiment 6, wherein the flue gas stream is flowed parallel to a cross-section of the at least one filter medium.

E9. The method of embodiments 1, 3-5, 7, or any combination thereof, wherein the at least one filter medium is disposed within at least one filter bag, wherein the at least one filter bag is housed within at least one filter bag housing, and wherein the at least one catalyst material is in the form of catalyst particles.

E10. The method of any of embodiments 1, 3-5, 7, 9, or any combination thereof, wherein the at least one filter medium comprises a porous protective layer and a porous catalytic layer, wherein the porous catalytic layer comprises the at least one catalyst material.

E11. The method of embodiment 10, wherein the porous protective layer comprises a microporous layer, wherein the microporous layer comprises an expanded polytetrafluoroethylene (ePTFE) membrane.

E12. The method of any of the preceding embodiments wherein the at least one catalyst material is adhered to the filter medium by at least one adhesive.

E13. The method of embodiment 12, wherein the at least one adhesive is chosen from polytetrafluoroethylene (PTFE), fluorinated ethylene propylene (FEP), high molecular weight polyethylene (HMWPE), high molecular weight polypropylene (HMWPP), perfluoroalkoxy alkane (PFA), polyvinylidene fluoride (PVDF), vinylidene fluoride (THV), chlorofluoroethylene (CFE), or any combination thereof.

E14. The method of embodiments, 9-10, 12, or any combination thereof, wherein the porous catalytic layer comprises at least one polymeric substrate.

E15. The method of embodiment 14, wherein the at least one polymeric substrate comprises a least one of: polytetrafluorethylene, poly(ethylene-co-tetrafluoroethylene), ultra-high molecular weight polyethylene, polyparaxylylene, polylactic acid, polyimide, polyamide, polyaramid, polyphenylene sulfide, fiberglass, or any combination thereof.

E16. The method of embodiments, 9-10, 12, wherein the porous catalytic layer includes at least one ceramic substrate.

E17. The method of embodiment 16, wherein the at least one ceramic substrate comprises ceramic fibers, wherein the ceramic fibers comprise, alkali metal silicates, alkaline earth metal silicates, aluminosilicates, or any combination thereof.

E18. The method of embodiments 9-10 or any combination thereof, wherein the porous catalytic layer is in the form of a layered assembly comprising a porous catalytic film and one or more felt batts, wherein the one or more felt batts are positioned on at least one side of the porous catalytic film.

E19. The method of embodiment 18, wherein the one or more felt batts comprise at least one of: a polytetrafluoroethylene (PTFE) felt, a PTFE fleece, an expanded polytetrafluoroethylene (ePTFE) felt, an ePTFE fleece, a woven fluoropolymer staple fiber, a nonwoven fluoropolymer staple fiber, or any combination thereof.

E20. The method of embodiment 18, 19, or any combination thereof, wherein the porous catalytic film comprises an expanded polytetrafluoroethylene (ePTFE) membrane.

E21. The method of embodiments 10, 18-19, or any combination thereof, wherein the catalyst particles are enmeshed within the porous catalytic layer.

E22. The method of embodiments 10, 18-20, or any combination thereof, wherein the porous catalytic layer comprises a least one of: polytetrafluorethylene (PTFE), poly(ethylene-co-tetrafluoroethylene) (ETFE), ultra-high molecular weight polyethylene (UHMWPE), polyparaxylylene (PPX), polylactic acid, polyimide, polyamide, polyaramid, polyphenylene sulfide, fiberglass, or any combination thereof.

E23. The method of embodiments 1-8, or any combination thereof, wherein the at least one filter medium is in the form of a ceramic candle, wherein the ceramic candle comprises at least one ceramic material.

E24. The method of embodiment 16, 17, 22, or any combination thereof, wherein the temperature of the flue gas stream ranges from 170° C. to 450° C. during the flowing step.

E25. The method of embodiment 23, 24, or any combination thereof, wherein the least one ceramic material is chosen from: silica-aluminate, calcium-magnesium-silicate, calcium-silicate fibers, or any combination thereof.

E26. The method of embodiments 24-25, or any combination thereof, wherein the at least one catalyst is in the form of catalyst particles, wherein the catalyst particles form a coating on the at least one ceramic material.

E27. The method of any of the preceding embodiments or any combination thereof, wherein the at least one catalyst material comprises at least one of: Vanadium Monoxide (VO), Vanadium Trioxide ($V_2O_3$), Vanadium Dioxide ($VO_2$), Vanadium Pentoxide ($V_2O_5$), Tungsten Trioxide ($WO_3$), Molybdenum Trioxide ($MoO_3$), Titanium Dioxide ($TiO_2$), Silicon Dioxide ($SiO_2$), Aluminum Trioxide ($Al_2O_3$), Manganese Oxide ($MnO_2$), zeolites, or any combination thereof.

E28. The method of any of the preceding embodiments or any combination thereof, wherein ABS deposits are disposed on the catalyst material of the at least one filter medium in a concentration ranging from 0.01% to 99% by mass of the at least one filter medium during the providing step.

E29. The method of any of the preceding embodiments or any combination thereof, wherein ABS deposits are disposed on the catalyst material of the at least one filter medium in a concentration ranging from 0.01% to 98% by mass of the at least one filter medium after the increasing step.

E30. The method of any of the preceding embodiments or any combination thereof, wherein the concentration of $NO_2$ is increased by introducing at least one oxidizing agent to the flue gas stream.

E31. The method of embodiment 21, wherein the at least one oxidizing agent is chosen from: hydrogen peroxide ($H_2O_2$), ozone ($O_3$), hydroxyl radical, or any combination thereof.

E32. The method of embodiment 21, wherein the concentration of $NO_2$ is increased by introducing additional $NO_2$ into the flue gas stream.

E33. The method of embodiments 1, 3, 4, 7, 9-32, or any combination thereof further comprising adding $NH_3$ in a concentration ranging from 0.0001% to 0.5% of the concentration of the flue gas stream.

E34. The method of any of the preceding embodiments or any combination thereof, wherein the $NO_x$ removal efficiency of the at least one filter medium is at least 0.5% higher after the increasing step than during the providing step.

E35. The method of embodiment 2, wherein the at least one filter medium is in the form of at least one of: a filter bag, a honeycomb structure, a monolith structure or any combination thereof.

E36. The method of any of the preceding embodiments or any combination thereof, wherein the increasing of the $NO_x$ removal efficiency comprises removing at least some of the ABS deposits, the AS deposits, or any combination thereof, from the at least one filter medium.

E37. A method comprising:
 providing at least one filter medium
  wherein the at least one filter medium comprises at least one catalyst material;
 flowing a flue gas stream transverse to a cross-section of the at least one filter medium, such that the flue gas stream passes through the cross section of the at least one filter medium from an upstream side of the filter medium to a downstream side of the filter medium;
  wherein the flue gas stream comprises:
   $NO_x$ compounds comprising:
    Nitric Oxide (NO), and
    Nitrogen Dioxide ($NO_2$);
   Sulfur Dioxide ($SO_2$); and
   Ammonia ($NH_3$);
 maintaining a constant $NO_x$ removal efficiency of the at least one filter medium;
  wherein the maintaining a constant $NO_x$ removal efficiency of the at least one filter medium comprises:
   providing $NO_2$ concentration, measured from the upstream side of the filter medium, in a range from 2% to 99% of a total concentration of the $NO_x$ compounds; and
   controlling $NO_2$ concentration, measured from the downstream side of the filter medium, to a range of from 0.0001% to 0.5% of the concentration of the flue gas stream
 wherein the method cleans the flue gas stream.

E38. The method of embodiment 37, wherein the $SO_2$, $NH_3$, and $NO_x$ compounds are present in an amount of at least 1 mg/m$^3$ based on a total volume of the flue gas stream.

E39. A method comprising:
 providing at least one filter medium
  wherein the at least one filter medium comprises at least one catalyst material;
 flowing a flue gas stream by a cross-section of the at least one filter medium, such that the flue gas stream is flowed parallel to a cross-section of the at least one filter medium from an upstream side of the filter medium to a downstream side of the filter medium;
  wherein the flue gas stream comprises:
   $NO_x$ compounds comprising:
    Nitric Oxide (NO), and
    Nitrogen Dioxide ($NO_2$);
   Sulfur Dioxide ($SO_2$); and
   Ammonia ($NH_3$);
 maintaining a constant $NO_x$ removal efficiency of the at least one filter medium;

wherein the maintaining a constant $NO_x$ removal efficiency of the at least one filter medium comprises:
providing $NO_2$ concentration, measured from the upstream side of the filter medium, in a range from 2% to 99% of a total concentration of the $NO_x$ compounds; and
controlling $NO_2$ concentration, measured from the downstream side of the filter medium, to a range of from 0.0001% to 0.5% of the concentration of the flue gas stream
wherein the method cleans the flue gas stream.

E40. The method of embodiment 39, wherein the $SO_2$, $NH_3$, and $NO_x$ compounds are present in an amount of at least 1 $mg/m^3$ based on a total volume of the flue gas stream.

E41. The method of embodiment 39, wherein the at least one filter medium is in the form of at least one of: a honeycomb structure, a monolith structure or any combination thereof.

E42. A filter medium comprising:
an upstream side;
a downstream side;
at least one catalyst material; and
ammonium bisulfate (ABS) deposits, ammonium sulfate (AS) deposits, or any combination thereof;
wherein the filter medium is configured to receive a flow of a flue gas stream transverse to a cross-section of the filter medium, such that the flue gas stream passes through the cross section of the at least one filter medium from the upstream side of the filter medium to the downstream side of the filter medium;
wherein the flue gas stream comprises:
$NO_x$ compounds comprising:
Nitric Oxide (NO), and
Nitrogen Dioxide ($NO_2$); and
wherein the at least one filter medium is configured to increase an $NO_x$ removal efficiency of the at least one filter medium upon an increase of to a range from 2% to 99% of a total concentration of the upstream $NO_x$ compounds.

E43. The filter medium of embodiment 42, wherein, the at least one filter medium is configured to further increase an $NO_x$ removal efficiency of the at least one filter medium when ammonia ($NH_3$) is added in a concentration ranging from 0.0001% to 0.5% of the concentration of the flue gas stream.

E44. A filter medium comprising:
an upstream side;
a downstream side; and
at least one catalyst material;
wherein the filter medium is configured to receive a flow of a flue gas stream transverse to a cross-section of the filter medium, such that the flue gas stream passes through the cross section of the at least one filter medium from the upstream side of the filter medium to the downstream side of the filter medium;
wherein the flue gas stream comprises:
$NO_x$ compounds comprising:
Nitric Oxide (NO), and
Nitrogen Dioxide ($NO_2$);
Sulfur Dioxide ($SO_2$); and
Ammonia ($NH_3$);
wherein the at least one filter medium is configured to maintain a constant $NO_x$ removal efficiency of the at least one filter medium when:
an $NO_2$ concentration, measured from the upstream side of the filter medium, is provided in a range from 2% to 99% of a total concentration of the $NO_x$ compounds; and
an $NO_2$ concentration, measured from the downstream side of the filter medium, is controlled to a range of from 0.0001% to 0.5% of the total concentration of the flue gas stream.

E45. A filter medium comprising:
an upstream side;
a downstream side; and
at least one catalyst material;
wherein the filter medium is configured to receive a flow of a flue gas stream by a cross-section of the filter medium, such that the flue gas stream is not flowed transverse to a cross-section of the at least one filter medium from an upstream side of the filter medium to a downstream side of the filter medium;
wherein the flue gas stream comprises:
$NO_x$ compounds comprising:
Nitric Oxide (NO), and
Nitrogen Dioxide ($NO_2$);
Sulfur Dioxide ($SO_2$); and
Ammonia ($NH_3$);
wherein the at least one filter medium is configured to maintain a constant $NO_x$ removal efficiency of the at least one filter medium when:
an $NO_2$ concentration, measured from the upstream side of the filter medium, is provided in a range from 2% to 99% of a total concentration of the $NO_x$ compounds; and
an $NO_2$ concentration, measured from the downstream side of the filter medium, is controlled to a range of from 0.0001% to 0.5% of the total concentration of the flue gas stream.

E46. A system comprising:
at least one filter medium,
wherein the at least one filter medium comprises:
an upstream side;
a downstream side;
at least one catalyst material; and
ammonium bisulfate (ABS) deposits, ammonium sulfate (AS) deposits, or any combination thereof;
at least one filter bag,
wherein the at least one filter medium is disposed within the at least one filter bag; and
at least one filter bag housing,
wherein the at least one filter bag is disposed within the at least one filter bag housing;
wherein the at least one filter bag housing is configured to receive a flow of a flue gas stream transverse to a cross-section of the at least one filter medium, such that the flue gas stream passes through the cross section of the at least one filter medium from the upstream side of the at least one filter medium to the downstream side of the at least one filter medium,
wherein the flue gas stream comprises:
$NO_x$ compounds comprising:
Nitric Oxide (NO), and
Nitrogen Dioxide ($NO_2$); and
wherein the system is configured to increase an $NO_x$ removal efficiency of the at least one filter medium when an upstream $NO_2$ concentration is increased to a range from 2% to 99% of a total concentration of the upstream $NO_x$ compounds.

E47. A filter bag housing comprising:
  a filter medium,
    wherein the filter medium comprises:
      an upstream side;
      a downstream side;
      at least one catalyst material; and
      ammonium bisulfate (ABS) deposits, ammonium sulfate (AS) deposits, or any combination thereof; and
  a filter bag,
    wherein the filter medium is disposed within the filter bag;
    wherein the filter bag is disposed within the filter bag housing;
  wherein the filter bag housing is configured to receive a flow of a flue gas stream transverse to a cross-section of the filter medium, such that the flue gas stream passes through the cross section of the at least one filter medium from the upstream side of the filter medium to the downstream side of the filter medium,
  wherein the flue gas stream comprises:
    $NO_x$ compounds comprising:
    Nitric Oxide (NO), and
    Nitrogen Dioxide ($NO_2$); and
  wherein the filter bag housing is configured to increase an $NO_x$ removal efficiency of the at least one filter medium when an upstream $NO_2$ concentration is increased to a range from 2% to 99% of a total concentration of the upstream $NO_x$ compounds.

E48. The method of embodiments 1 to 41 or any combination thereof, wherein $NO_2$ is added to the flue gas stream periodically, so as to maintain the $NO_x$ removal efficiency in an amount of at least 70% of an initial $NO_x$ efficiency.

E49. The method of embodiment 48, wherein the periodic addition of $NO_2$ comprises increasing $NO_2$ every 1 to 40,000 hours.

E50. The method of embodiment 48, 49, or any combination thereof, wherein the periodic addition occurs at constant time intervals.

E51. The method of embodiment 48, 49, or any combination thereof, wherein the periodic addition occurs at variable time intervals.

E52. The method of embodiment 51, wherein variable time intervals are random time intervals.

E53. The method of embodiments 1 to 41 or any combination thereof, wherein $NO_2$ is added to the flue gas stream continuously, so as to maintain the $NO_x$ removal efficiency in an amount of at least 70% of an initial $NO_x$ efficiency.

E54. The method of embodiment 53 wherein the continuous addition of the $NO_2$ comprises providing $NO_2$ at a flow rate of 2% to 99% of a total flow rate of the upstream $NO_x$ compounds.

E55. A method comprising:
  providing at least one filter medium
    wherein the at least one filter medium comprises at least one catalyst material;
  flowing a flue gas stream transverse to a cross-section of the at least one filter medium, such that the flue gas stream passes through the cross section of the at least one filter medium from an upstream side of the filter medium to a downstream side of the filter medium;
  wherein the flue gas stream comprises:
    $NO_x$ compounds comprising:
      Nitric Oxide (NO), and
      Nitrogen Dioxide ($NO_2$);
    Sulfur Dioxide ($SO_2$); and
    Ammonia ($NH_3$);
  maintaining an $NO_x$ removal efficiency of the at least one filter medium in an amount of at least 70% of an initial $NO_x$ efficiency by:
    providing an $NO_2$ concentration, measured from the upstream side of the filter medium, in a range from 2% to 99% of a total concentration of the $NO_x$ compounds; and
    controlling $NO_2$ concentration, measured from the downstream side of the filter medium, to a range of from 0.0001% to 0.5% of the concentration of the flue gas stream
  wherein the method cleans the flue gas stream.

E56. The method of embodiment 55, wherein the $NO_x$ removal efficiency of the at least one filter medium is maintained in a range of 70% to 99% of the initial $NO_x$ efficiency.

E57. The method of embodiment 55, 60, or any combination thereof, wherein during the maintaining of the $NO_x$ removal efficiency, the $NO_2$ concentration is increased periodically.

E58. The method of embodiment 57, wherein the periodic increase of $NO_2$ comprises increasing $NO_2$ every 1 to 40,000 hours.

E59. The method of embodiment 57, 58, or any combination thereof, wherein the periodic increase occurs at constant time intervals.

E60. The method of embodiment 57, 58, or any combination thereof, wherein the periodic increase occurs at variable time intervals.

E61. The method of embodiment 60, wherein variable time intervals are random time intervals.

E62. The method of any of embodiments 55, 60, or any combination thereof, wherein during the providing of the $NO_2$ concentration, the $NO_2$ concentration is provided continuously.

E63. The method of embodiment 62, wherein the continuous providing of the $NO_2$ comprises providing $NO_2$ at a flow rate of 2% to 99% of a total flow rate of the upstream $NO_x$ compounds.

E64. A method comprising:
  providing at least one filter medium;
    wherein the at least one filter medium comprises:
      at least one catalyst material; and
      ammonium bisulfate (ABS) deposits, ammonium sulfate (AS) deposits, or any combination thereof;
  flowing a flue gas stream transverse to a cross-section of the at least one filter medium, such that the flue gas stream passes through the cross section of the at least one filter medium,
  wherein the flue gas stream comprises:
    $NO_x$ compounds comprising:
      Nitric Oxide (NO), and
      Nitrogen Dioxide ($NO_2$); and
  increasing $NO_x$ removal efficiency of the at least one filter medium;
    wherein the increasing of the $NO_x$ removal efficiency of the at least one filter medium comprises increasing an upstream $NO_2$ concentration to a range from 2% to 99% of a total concentration of the upstream $NO_x$ compounds, wherein increasing the upstream $NO_2$ concentration to a range from 2% to 99% of a total concentration of the upstream $NO_x$ compounds comprises introducing additional $NO_2$ into the flue gas stream; and
  wherein the method regenerates the at least one filter medium.

E65. The method of embodiment 64, wherein a temperature of the flue gas stream ranges from 160° C. to 280° C. during the flowing step.

E66. The method of embodiment 64 or embodiment 65, wherein the flue gas stream further comprises Oxygen ($O_2$), Water ($H_2O$), Nitrogen ($N_2$), Carbon Monoxide (CO), Sulfur Dioxide ($SO_2$), Sulfur Trioxide ($SO_3$), one or more hydrocarbons, or any combination thereof.

E67. The method of any of embodiments 64 to 66, wherein flowing the flue gas stream transverse to the cross-section of the at least one filter medium comprises flowing the flue gas stream perpendicular to the cross-section of the at least one filter medium.

E68. The method of any of embodiments 64 to 67, wherein the at least one filter medium is disposed within at least one filter bag, wherein the at least one filter bag is housed within at least one filter bag housing, and wherein the at least one catalyst material is in the form of catalyst particles.

E69. The method of embodiment 68, wherein the at least one filter medium comprises:
a porous protective layer; and
a porous catalytic layer, wherein the porous catalytic layer comprises the catalyst particles.

E70. The method of embodiment 69, wherein the porous protective layer of the at least one filter medium comprises a microporous layer, wherein the microporous layer comprises an expanded polytetrafluoroethylene (ePTFE) membrane.

E71. The method of embodiment 69 or embodiment 70, wherein the porous catalytic layer of the at least one filter medium comprises at least one polymeric substrate.

E72. The method of any of embodiments 69 to 71, wherein the porous catalytic layer comprises at least one ceramic substrate.

E73. The method any of embodiments 69 to 72, wherein the porous catalytic layer comprises polytetrafluoroethylene (PTFE), poly(ethylene-co-tetrafluoroethylene) (ETFE), ultra-high molecular weight polyethylene (UHMWPE), polyparaxylylene (PPX), polylactic acid, polyimide, polyamide, polyaramid, polyphenylene sulfide, fiberglass, or any combination thereof.

E74. The method of any of embodiments 69 to 73, wherein the catalyst particles are enmeshed within the porous catalytic layer.

E75. The method of any of embodiments 69 to 74, wherein the porous catalytic layer is in the form of a layered assembly comprising:
a porous catalytic film; and
at least one felt batt, wherein the at least one felt batt is positioned on at least one side of the porous catalytic film.

E76. The method of embodiment 75, wherein the porous catalytic film comprises an expanded polytetrafluoroethylene (ePTFE) membrane.

E77. The method of embodiment 75 or 76, wherein the at least one felt batt comprises: a polytetrafluoroethylene (PTFE) felt, a PTFE fleece, an expanded polytetrafluoroethylene (ePTFE) felt, an ePTFE fleece, a woven fluoropolymer staple fiber, a nonwoven fluoropolymer staple fiber, or any combination thereof.

E78. The method of any of embodiments 64 to 77, wherein the at least one catalyst material comprises at least one of: Vanadium Monoxide (VO), Vanadium Trioxide ($V_2O_3$), Vanadium Dioxide ($VO_2$), Vanadium Pentoxide ($V_2O_5$), Tungsten Trioxide ($WO_3$), Molybdenum Trioxide ($MoO_3$), Titanium Dioxide ($TiO_2$), Silicon Dioxide ($SiO_2$), Aluminum Trioxide ($Al_2O_3$), Manganese Oxide ($MnO_2$), zeolites, or any combination thereof.

E79. The method of any of embodiments 64 to 75, wherein ABS deposits are disposed on the catalyst material of the at least one filter medium in a concentration ranging from 0.01% to 99% by mass of the at least one filter medium during the providing step.

E80. The method of any of embodiments 64 to 79, wherein, after increasing the upstream $NO_2$ concentration to a range from 2% to 99% of a total concentration of the upstream $NO_x$ compounds, ABS deposits are disposed on the catalyst material of the at least one filter medium in a concentration ranging from 0.01% to 98% by mass of the at least one filter medium.

E81. The method of any of embodiments 64 to 80, wherein the increasing of the $NO_x$ removal efficiency further comprises removing at least some of the ABS deposits, the AS deposits, or any combination thereof, from the at least one filter medium.

E82. A method comprising:
providing at least one filter medium
wherein the at least one filter medium comprises at least one catalyst material;
flowing a flue gas stream transverse to a cross-section of the at least one filter medium, such that the flue gas stream passes through the cross section of the at least one filter medium from an upstream side of the filter medium to a downstream side of the filter medium;
wherein the flue gas stream comprises:
$NO_x$ compounds comprising:
Nitric Oxide (NO), and
Nitrogen Dioxide ($NO_2$);
Sulfur Dioxide ($SO_2$); and
Ammonia ($NH_3$);
maintaining a constant $NO_x$ removal efficiency of the at least one filter medium;
wherein the maintaining a constant $NO_x$ removal efficiency of the at least one filter medium comprises:
providing an $NO_2$ concentration, measured from the upstream side of the filter medium, in a range from 2% to 99% of a total concentration of the $NO_x$ compounds, wherein providing the $NO_2$ concentration, measured from the upstream side of the filter medium, in a range from 2% to 99% of a total concentration of the $NO_x$ compounds comprises introducing additional $NO_2$ into the flue gas stream; and
controlling the $NO_2$ concentration, measured from the downstream side of the filter medium, to a range of from 0.0001% to 0.5% of the concentration of the flue gas stream;
wherein the method cleans the flue gas stream.

E83. A system comprising:
at least one filter medium,
wherein the at least one filter medium comprises:
an upstream side;
a downstream side;
at least one catalyst material; and
ammonium bisulfate (ABS) deposits, ammonium sulfate (AS) deposits, or any combination thereof;
at least one filter bag,
wherein the at least one filter medium is disposed within the at least one filter bag; and at least one filter bag housing,
   wherein the at least one filter bag is disposed within the at least one filter bag housing;
   wherein the at least one filter bag housing is configured to receive a flow of a flue gas stream transverse to a cross-section of the at least one filter medium, such that the flue gas stream passes through the cross section of the at least one filter medium from the upstream side of the at least one filter medium to the downstream side of the at least one filter medium,
      wherein the flue gas stream comprises:
         $NO_x$ compounds comprising:
         Nitric Oxide (NO), and
         Nitrogen Dioxide ($NO_2$); and
   wherein the system is configured to increase a $NO_x$ removal efficiency of the at least one filter medium when an upstream $NO_2$ concentration is increased to a range from 2% to 99% of a total concentration of the upstream $NO_x$ compounds, and wherein the upstream $NO_2$ concentration is increased to a range from 2% to 99% of a total concentration of the upstream $NO_x$ compounds by introducing additional $NO_2$ into the flue gas stream.

E84. A method comprising:
   providing at least one filter medium
      wherein the at least one filter medium comprises at least one catalyst material;
   flowing a flue gas stream transverse to a cross-section of the at least one filter medium, such that the flue gas stream passes through the cross section of the at least one filter medium from an upstream side of the filter medium to a downstream side of the filter medium;
      wherein the flue gas stream comprises:
         $NO_x$ compounds comprising:
            Nitric Oxide (NO), and
            Nitrogen Dioxide ($NO_2$);
         Sulfur Dioxide ($SO_2$); and
         Ammonia ($NH_3$);
   maintaining a $NO_x$ removal efficiency of the at least one filter medium in an amount of at least 70% of an initial $NO_x$ efficiency by:
      providing an $NO_2$ concentration, measured from the upstream side of the filter medium, in a range from 2% to 99% of a total concentration of the $NO_x$ compounds, wherein providing the $NO_2$ concentration, measured from the upstream side of the filter medium, in a range from 2% to 99% of a total concentration of the $NO_x$ compounds comprises introducing additional $NO_2$ into the flue gas stream; and
      controlling $NO_2$ concentration, measured from the downstream side of the filter medium, to a range of from 0.0001% to 0.5% of the concentration of the flue gas stream
wherein the method cleans the flue gas stream.

E85. The method of embodiment 84, wherein maintaining the $NO_x$ removal efficiency comprises maintaining the $NO_x$ removal efficiency in a range of 70% to 99% of the initial $NO_x$ efficiency.

E86. The method of embodiment 84 or 85, wherein maintaining of the $NO_x$ removal efficiency comprises increasing $NO_2$ concentration periodically.

E87. The method of embodiment 86, wherein increasing $NO_2$ concentration periodically comprises increasing $NO_2$ every 1 to 40,000 hours.

E88. The method of embodiment 86 or 87, wherein increasing $NO_2$ concentration periodically comprises increasing $NO_2$ at constant time intervals.

E89. The method of embodiment 86 or 87, wherein increasing $NO_2$ concentration periodically comprises increasing $NO_2$ at variable time intervals.

E90. The method of embodiment 89, wherein the variable time intervals are random time intervals.

E91. The method of embodiment 84, wherein providing the $NO_2$ concentration comprises providing the $NO_2$ concentration continuously.

E92. The method of embodiment 91, further comprising providing the $NO_2$ concentration continuously comprises providing $NO_2$ at a flow rate of 2% to 99% of a total flow rate of the upstream $NO_x$ compounds.

E93. A method comprising:
   providing at least one filter medium;
      wherein the at least one filter medium comprises:
         at least one catalyst material; and
         ammonium bisulfate (ABS) deposits, ammonium sulfate (AS) deposits, or any combination thereof;
   flowing a flue gas stream transverse to a cross-section of the at least one filter medium, such that the flue gas stream passes through the cross section of the at least one filter medium,
      wherein the flue gas stream comprises:
         $NO_x$ compounds comprising:
            Nitric Oxide (NO), and
            Nitrogen Dioxide ($NO_2$); and
   increasing $NO_x$ removal efficiency of the at least one filter medium;
      wherein the increasing of the $NO_x$ removal efficiency of the at least one filter medium comprises increasing an upstream $NO_2$ concentration to a range from 2% to 99% of a total concentration of the upstream $NO_x$ compounds, wherein increasing the upstream $NO_2$ concentration to a range from 2% to 99% of a total concentration of the upstream $NO_x$ compounds comprises introducing at least one oxidizing agent into the flue gas stream;
wherein the method regenerates the at least one filter medium.

E94. The method of embodiment 93, wherein a temperature of the flue gas stream ranges from 160° C. to 280° C. during the flowing step.

E95. The method of embodiment 93 or embodiment 94, wherein the flue gas stream further comprises Oxygen ($O_2$), Water ($H_2O$), Nitrogen ($N_2$), Carbon Monoxide (CO), Sulfur Dioxide ($SO_2$), Sulfur Trioxide ($SO_3$), one or more hydrocarbons, or any combination thereof.

E96. The method of any of embodiments 93 to 95, wherein flowing the flue gas stream transverse to the cross-section of the at least one filter medium comprises flowing the flue gas stream perpendicular to the cross-section of the at least one filter medium.

E97. The method of any of embodiments 93 to 96, wherein the at least one filter medium is disposed within at least one filter bag, wherein the at least one filter bag is housed within at least one filter bag housing, and wherein the at least one catalyst material is in the form of catalyst particles.

E98. The method of embodiment 97, wherein the at least one filter medium comprises:
   a porous protective layer; and
   a porous catalytic layer, wherein the porous catalytic layer comprises the catalyst particles.

E99. The method of embodiment 98, wherein the porous protective layer of the at least one filter medium comprises a microporous layer, wherein the microporous layer comprises an expanded polytetrafluoroethylene (ePTFE) membrane.

E100. The method of embodiment 98 or embodiment 99, wherein the porous catalytic layer of the at least one filter medium comprises at least one polymeric substrate.

E101. The method of any of embodiments 98 to 100, wherein the porous catalytic layer comprises at least one ceramic substrate.

E102. The method of any of embodiments 98 to 101, wherein the porous catalytic layer comprises polytetrafluoroethylene (PTFE), poly(ethylene-co-tetrafluoroethylene) (ETFE), ultra-high molecular weight polyethylene (UHMWPE), polyparaxylylene (PPX), polylactic acid, polyimide, polyamide, polyaramid, polyphenylene sulfide, fiberglass, or any combination thereof.

E103. The method of any of embodiments 98 to 102, wherein the catalyst particles are enmeshed within the porous catalytic layer.

E104. The method of any of embodiments 98 to 103, wherein the porous catalytic layer is in the form of a layered assembly comprising:
a porous catalytic film; and
at least one felt batt, wherein the at least one felt batt is positioned on at least one side of the porous catalytic film.

E105. The method of embodiment 104, wherein the porous catalytic film comprises an expanded polytetrafluoroethylene (ePTFE) membrane.

E106. The method of embodiment 104, wherein the at least one felt batt comprises: a polytetrafluoroethylene (PTFE) felt, a PTFE fleece, an expanded polytetrafluoroethylene (ePTFE) felt, an ePTFE fleece, a woven fluoropolymer staple fiber, a nonwoven fluoropolymer staple fiber, or any combination thereof.

E107. The method of any of embodiments 93 to 106, wherein the at least one catalyst material comprises at least one of: Vanadium Monoxide (VO), Vanadium Trioxide ($V_2O_3$), Vanadium Dioxide ($VO_2$), Vanadium Pentoxide ($V_2O_5$), Tungsten Trioxide ($WO_3$), Molybdenum Trioxide ($MoO_3$), Titanium Dioxide ($TiO_2$), Silicon Dioxide ($SiO_2$), Aluminum Trioxide ($Al_2O_3$), Manganese Oxide ($MnO_2$), zeolites, or any combination thereof.

E108. The method of any of embodiments 93 to 107, wherein ABS deposits are disposed on the catalyst material of the at least one filter medium in a concentration ranging from 0.01% to 99% by mass of the at least one filter medium during the providing step.

E109. The method of any of embodiments 93 to 108, wherein, after increasing the upstream $NO_2$ concentration to a range from 2% to 99% of a total concentration of the upstream $NO_x$ compounds, ABS deposits are disposed on the catalyst material of the at least one filter medium in a concentration ranging from 0.01% to 98% by mass of the at least one filter medium.

E110. The method of any of embodiments 93 to 109, wherein the at least one oxidizing agent is chosen from: hydrogen peroxide ($H_2O_2$), ozone ($O_3$), hydroxyl radical, or any combination thereof.

E111. The method of any of embodiments 93 to 110, wherein the increasing of the $NO_x$ removal efficiency further comprises removing at least some of the ABS deposits, the AS deposits, or any combination thereof, from the at least one filter medium.

E112. The method of embodiment 110 or 111, wherein the at least one oxidizing agent is $H_2O_2$.

E113. The method of embodiment 112, wherein the $H_2O_2$ is introduced into the flue gas stream in a sufficient amount so as to oxidize at least some of the NO in the flue gas stream to $NO_2$, wherein the oxidation of at least some of the NO in the flue gas stream to $NO_2$ results in the $NO_2$ having the upstream concentration of 2% to 99% of the total concentration of the upstream $NO_x$ compounds.

E114. The method of embodiment 113, wherein the oxidation of at least some of the NO in the flue gas stream to $NO_2$ results in the $NO_2$ having an upstream concentration of 25% to 50% of the total concentration of the upstream $NO_x$ compounds.

E115. The method of embodiment 113, wherein the sufficient amount of $H_2O_2$ that is introduced into the flue gas stream is an amount sufficient to oxidize at least 30% of the NO concentration in the flue gas stream to $NO_2$.

E116. The method of embodiment 113, wherein the sufficient amount of $H_2O_2$ that is introduced into the flue gas stream is an amount sufficient to oxidize 30% to 50% of the NO concentration in the flue gas stream to $NO_2$ E117. The method of embodiment 113, wherein the sufficient amount of $H_2O_2$ that is introduced into the flue gas stream is 0.1 wt % $H_2O_2$ to 30 wt % $H_2O_2$ based on a total weight of the flue gas stream.

E118. The method of any of embodiments 93 to 117, further comprising adding ammonia ($NH_3$) to the flue gas stream.

E119. The method of embodiment 118, wherein the $NH_3$ is added a concentration ranging from 0.0001% to 0.5% of the concentration of the flue gas stream.

E120. A method comprising:
providing at least one filter medium
wherein the at least one filter medium comprises at least one catalyst material;
flowing a flue gas stream transverse to a cross-section of the at least one filter medium, such that the flue gas stream passes through the cross section of the at least one filter medium from an upstream side of the filter medium to a downstream side of the filter medium;
wherein the flue gas stream comprises:
$NO_x$ compounds comprising:
Nitric Oxide (NO), and
Nitrogen Dioxide ($NO_2$);
Sulfur Dioxide ($SO_2$); and
Ammonia ($NH_3$);
maintaining a constant $NO_x$ removal efficiency of the at least one filter medium;
wherein the maintaining a constant $NO_x$ removal efficiency of the at least one filter medium comprises:
providing an $NO_2$ concentration, measured from the upstream side of the filter medium, in a range from 2% to 99% of a total concentration of the $NO_x$ compounds, wherein providing the $NO_2$ concentration, measured from the upstream side of the filter medium, in a range from 2% to 99% of a total concentration of the $NO_x$ compounds comprises introducing at least one oxidizing agent into the flue gas stream; and controlling the $NO_2$ concentration, measured from the downstream side of the filter medium, to a range of from 0.0001% to 0.5% of the concentration of the flue gas stream;
wherein the method cleans the flue gas stream.

E121. A system comprising:
at least one filter medium,
wherein the at least one filter medium comprises:
an upstream side;
a downstream side;
at least one catalyst material; and
ammonium bisulfate (ABS) deposits, ammonium sulfate (AS) deposits, or any combination thereof;
at least one filter bag,
wherein the at least one filter medium is disposed within the at least one filter bag; and
at least one filter bag housing,
wherein the at least one filter bag is disposed within the at least one filter bag housing;
wherein the at least one filter bag housing is configured to receive a flow of a flue gas stream transverse to a cross-section of the at least one filter medium, such that the flue gas stream passes through the cross section of the at least one filter medium from the upstream side of the at least one filter medium to the downstream side of the at least one filter medium,
wherein the flue gas stream comprises:
$NO_x$ compounds comprising:
Nitric Oxide (NO), and
Nitrogen Dioxide ($NO_2$); and
wherein the system is configured to increase an $NO_x$ removal efficiency of the at least one filter medium when an upstream $NO_2$ concentration is increased to a range from 2% to 99% of a total concentration of the upstream $NO_x$ compounds, and wherein the upstream $NO_2$ concentration is increased to a range from 2% to 99% of a total concentration of the upstream $NO_x$ compounds by introducing at least one oxidizing agent into the flue gas stream.

E122. A method comprising:
providing at least one filter medium
wherein the at least one filter medium comprises at least one catalyst material;
flowing a flue gas stream transverse to a cross-section of the at least one filter medium, such that the flue gas stream passes through the cross section of the at least one filter medium from an upstream side of the filter medium to a downstream side of the filter medium;
wherein the flue gas stream comprises:
$NO_x$ compounds comprising:
Nitric Oxide (NO), and
Nitrogen Dioxide ($NO_2$);
Sulfur Dioxide ($SO_2$); and
Ammonia ($NH_3$);
maintaining a $NO_x$ removal efficiency of the at least one filter medium in an amount of at least 70% of an initial $NO_x$ efficiency by:
providing an $NO_2$ concentration, measured from the upstream side of the filter medium, in a range from 2% to 99% of a total concentration of the $NO_x$ compounds, wherein providing the $NO_2$ concentration, measured from the upstream side of the filter medium, in a range from 2% to 99% of a total concentration of the $NO_x$ compounds comprises introducing at least one oxidizing agent into the flue gas stream; and
controlling $NO_2$ concentration, measured from the downstream side of the filter medium, to a range of from 0.0001% to 0.5% of the concentration of the flue gas stream;
wherein the method cleans the flue gas stream.

E123. A filter medium comprising:
an upstream side;
a downstream side;
at least one catalyst material; and
ammonium bisulfate (ABS) deposits, ammonium sulfate (AS) deposits, or any combination thereof;
wherein the filter medium is configured to receive a flow of a flue gas stream transverse to a cross-section of the filter medium, such that the flue gas stream passes through the cross section of the at least one filter medium from the upstream side of the filter medium to the downstream side of the filter medium;
wherein the flue gas stream comprises:
$NO_x$ compounds comprising:
Nitric Oxide (NO), and
Nitrogen Dioxide ($NO_2$); and
wherein the at least one filter medium is configured to increase a $NO_x$ removal efficiency of the at least one filter medium upon an increase of upstream $NO_2$ to a range from 2% to 99% of a total concentration of the upstream $NO_x$ compounds, wherein the increase of upstream $NO_2$ to a range from 2% to 99% of a total concentration of the upstream $NO_x$ compounds comprises introducing at least one oxidizing agent into the flue gas stream.

E124. A filter medium comprising:
an upstream side;
a downstream side;
at least one catalyst material; and
ammonium bisulfate (ABS) deposits, ammonium sulfate (AS) deposits, or any combination thereof;
wherein the filter medium is configured to receive a flow of a flue gas stream transverse to a cross-section of the filter medium, such that the flue gas stream passes through the cross section of the at least one filter medium from the upstream side of the filter medium to the downstream side of the filter medium;
wherein the flue gas stream comprises:
$NO_x$ compounds comprising:
Nitric Oxide (NO), and
Nitrogen Dioxide ($NO_2$); and
wherein the at least one filter medium is configured to increase a $NO_x$ removal efficiency of the at least one filter medium upon an increase of upstream $NO_2$ to a range from 2% to 99% of a total concentration of the upstream $NO_x$ compounds, wherein the increase of upstream $NO_2$ to a range from 2% to 99% of a total concentration of the upstream $NO_x$ compounds comprises introducing additional $NO_2$ into the flue gas stream.

EXAMPLES

Example 1: In-Situ "Flow-Through" Regeneration of Filter Medium Including a Catalyst Coated Composite Article by NO and $NO_2$ Gas Mixture An exemplary filter medium including a non-limiting example of a catalyst material in the form of a catalyst coated composite article was prepared on a porous substrate having active catalyst particles adhered to the surface by a polymer adhesive according to U.S. Pat. No. 6,331,351.

In-Situ "Flow-Through" Regeneration by NO and $NO_2$ Mixture

The filter medium including the catalyst coated composite sample was returned from the field after exposure to a flue gas stream. The deposition of ammonium bisulfate on the returned sample was confirmed by Fourier-transform infrared spectroscopy (FTIR, Thermal Nicolet iS50). During an in-situ regeneration, a 4.5 inch (~1.77 cm)×4.5 inch (~1.77 cm) sample filter medium including a catalyst coated composite sample was placed in a reactor. A gas mixture including 310 ppm NO, 330 ppm $NO_2$, 4% $O_2$, 8% water moisture and $N_2$ was set to flow-through the catalyst coated composite sample at 230° C. with a total flowrate of 2 L/min. The gas phase NO and $NO_2$ concentration were monitored with a MKS MULTI-GAS™ 2030D FTIR analyzer (MKS Instruments, Andover, Mass.). The NO and $NO_2$ gas mixture was obtained by partially oxidizing NO to $NO_2$ by $O_3$ generated from the TG-20 $O_3$ generator (Ozone solutions, Hull, Iowa). $NO_x$ removal efficiency was measured before in-situ regeneration treatment and 2, 4, 6, 8, 10 hours after in-situ regeneration treatment.

$NO_x$ Reaction Efficiency

The filter medium including the catalyst coated composite article was tested for catalytic $NO_x$ removal efficiency from a simulated flue gas at 230° C. The simulated flue gas contained 200 ppm NO, 200 ppm $NH_3$, 5% $O_2$, and $N_2$ with a total flowrate of 3.4 L/min. To determine $NO_x$ removal efficiency, the upstream (i.e., the concentration of $NO_x$ entering into the chamber before exposure to the filter medium) and downstream concentration (i.e. the concentration of $NO_x$ exiting the chamber after exposure to the filter medium) of NO were monitored with a MKS MULTI-GAS™ 2030D FTIR analyzer (MKS Instruments, Andover, Mass.). $NO_x$ removal efficiency was calculated according to the following formula where 'NO' indicates the concentration of NO in the respective stream.

$NO_x$ removal efficiency ("$DeNO_x$") (%)=(NO in–NO out)/NO in×100%.

Figure 2:
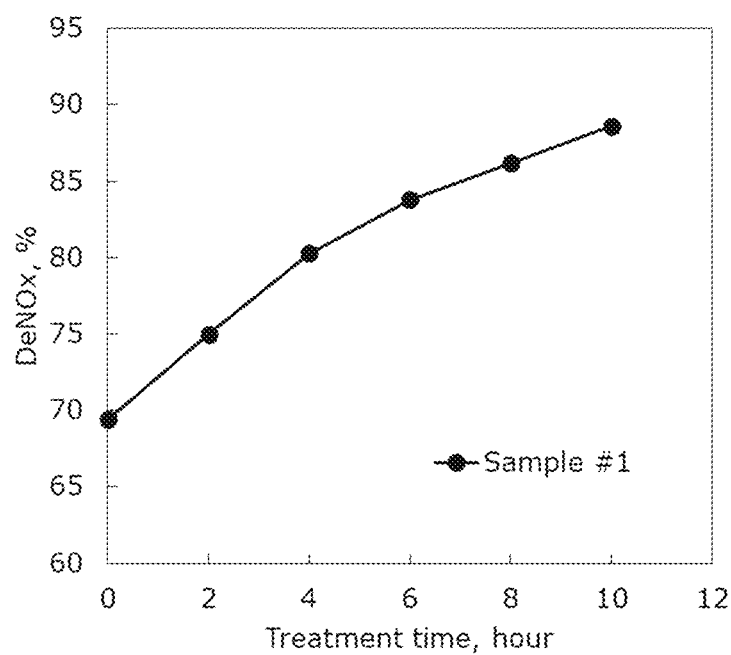
FIG. 2 depicts an exemplary $NO_x$ removal efficiency after in-situ flow-through regeneration by NO and $NO_2$ gas mixture on an exemplary filter medium.

Results are shown in FIG. 2. The improved $NO_x$ removal efficiency over time, shown in FIG. 2, demonstrates that the filter medium was successfully regenerated.

Example 2: In-Situ "Flow-Through" Regeneration of Filter Medium Including a Catalytic Composite Article by NO and $NO_2$ Gas Mixture A filter medium including a catalytic composite article is formed according to International Publication No. WO 2019/099025. The filter medium included a catalytic composite article having a layered assembly that included a polytetrafluoroethylene (PTFE)+catalyst composite membrane having a first, upstream side and a second, downstream side; and one or more felt batts. Each felt batt was formed of fleece formed from PTFE staple fiber. The filter medium was connected together by a plurality of perforations formed by a needle punching process, by a needling process, or both.

The PTFE+catalyst composite membrane of the filter medium described above were prepared using the general dry blending methodology taught in U.S. Pat. No. 7,791,861. to form composite tapes that were then uniaxially expanded according to the teachings of U.S. Pat. No. 3,953,556. The resulting porous fibrillated expanded PTFE (ePTFE) composite membranes included supported catalyst particles durably enmeshed and immobilized with the ePTFE node and fibril matrix.

In-Situ "Flow-Through" Regeneration by NO and $NO_2$ Mixture

The sample filter medium including the sample catalytic composite article described above was in-situ fouled by 400 ppm NO, 440 ppm $NH_3$, 3000 ppm $SO_2$ and 8% water moisture at 230° C. and returned from Innovative combustion Technologies (ICT). During an in-situ regeneration, a particular filter medium including a square catalytic composite sample (4.5 inch×4.5 inch) returned from ICT was placed in a reactor. A gas mixture including 330 ppm NO, 330 ppm $NO_2$, 4% $O_2$, 8% water moisture, and $N_2$ was set to flow-through the catalytic composite sample at 230° C. with a total flowrate of 2 L/min. The NO and $NO_2$ gas mixture was obtained by partially oxidizing NO to $NO_2$ by $O_3$ generated from the TG-20 $O_3$ generator (Ozone solutions, Hull, Iowa). $NO_x$ removal efficiency was measured before in-situ regeneration treatment and 4, 10, 15, 21, 24 hours after in-situ regeneration treatment. The downstream (i.e. the concentration of $NO_x$ exiting the chamber after exposure to the filter medium) gas phase NO and $NO_2$ concentrations were monitored with a MKS MULTI-GAS™ 2030D FTIR analyzer (MKS Instruments, Andover, Mass.).

$NO_x$ Reaction Efficiency

The filter medium including the sample catalytic composite article was tested for catalytic $NO_x$ removal efficiency at 230° C. from a simulated flue gas. The simulated flue gas contained 200 ppm NO, 200 ppm $NH_3$, 5 vol % $O_2$, 5% water moisture, and $N_2$ with a total flowrate of 3.4 L/min. In order to determine $NO_x$ removal efficiency, the upstream (i.e., the concentration of $NO_x$ entering into the chamber before exposure to the filter medium) and downstream concentration (i.e. the concentration of $NO_x$ exiting the chamber relative after exposure to the filter medium) of NO were monitored with a MKS MULTI-GAS™ 2030D FTIR analyzer (MKS Instruments, Andover, Mass.). $NO_x$ removal efficiency was calculated according to the following formula where 'NO' indicates the concentration of NO in the respective stream.

$NO_x$ removal efficiency ("$DeNO_x$") (%)=(NO in–NO out)/NO in ×100%

Relative $DeNO_x$ removal efficiency (%)=$DeNO_x$ after regeneration/$DeNO_x$ of a fresh control sample.

Figure 3:
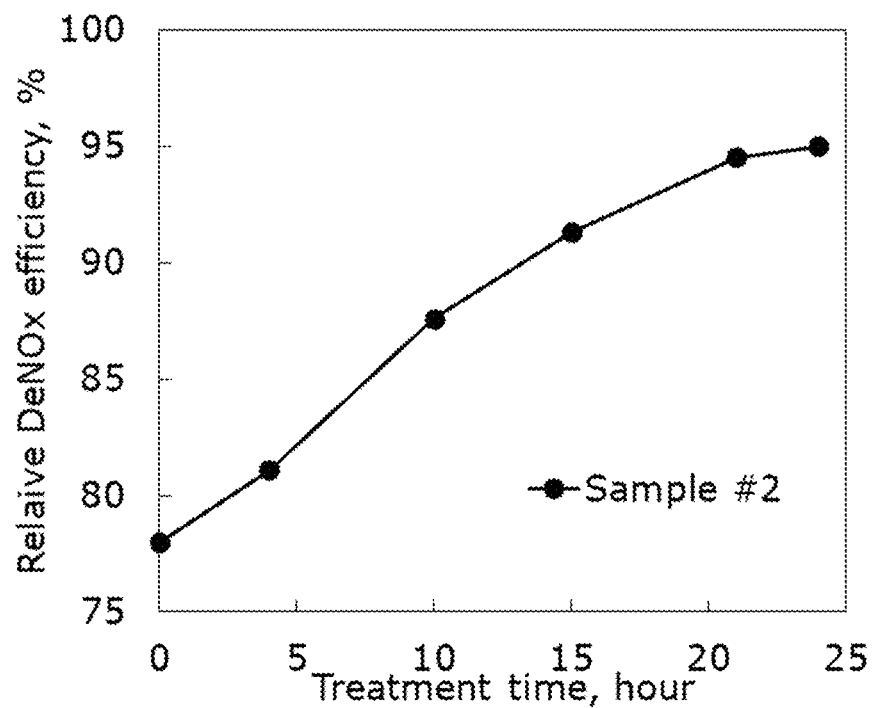
FIG. 3 depicts an exemplary relative $NO_x$ removal efficiency after in-situ flow-through regeneration by NO and $NO_2$ gas mixture on an exemplary filter medium.
Figure 4:
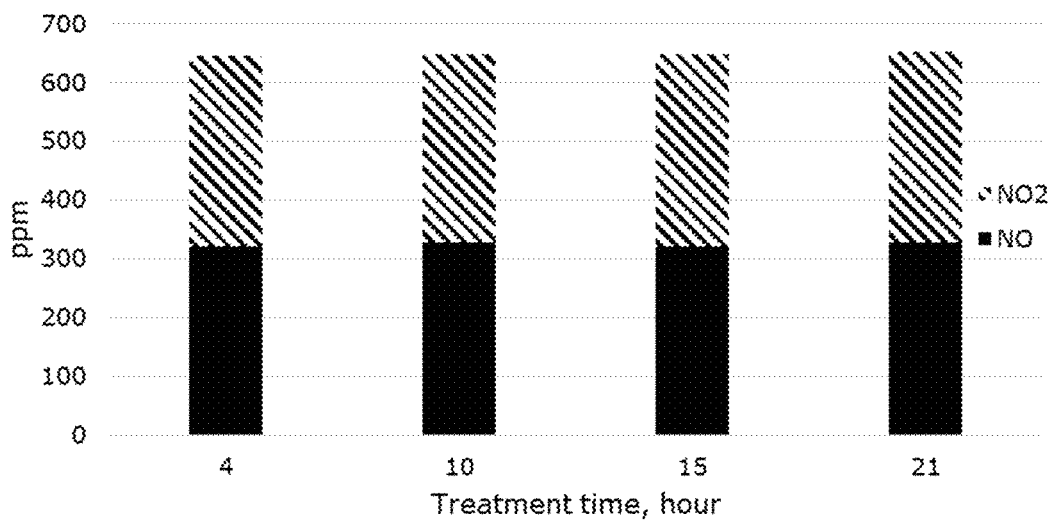
FIG. 4 depicts exemplary $NO_x$ concentrations, measured from a downstream side of an exemplary filter medium, during the in-situ flow through regeneration by an NO and $NO_2$ mixture.

Results are shown in FIGS. 3 and 4. The improved $NO_x$ removal efficiency over time, shown in FIGS. 3 and 4, demonstrates that the filter medium was successfully regenerated.

Example 3: In-Situ "Flow-Through" Regeneration of Filter Medium Including a Catalytic Composite Article by NO, $NO_2$ and $NH_3$ Gas Mixture A catalytic composite article was used as described in Example 2.

In-Situ Flow-Through Regeneration by NO, $NO_2$, and $NH_3$ Mixture

Sample filter medium including the sample catalytic composite article described in Example 2 in-situ fouled by 400 ppm NO, 440 ppm $NH_3$, 3000 ppm $SO_2$ and 8% water moisture at 230° C. and returned from Innovative combustion Technologies (ICT). During an in-situ regeneration, a particular filter medium including a square catalytic composite sample (4.5 inch×4.5 inch) returned from ICT was placed in a reactor. A gas mixture including 330 ppm NO, 330 ppm $NO_2$, 85 ppm $NH_3$, 4% $O_2$, 8% water moisture, and $N_2$ was set to flow-through the catalytic composite sample at 230° C. with a total flowrate of 2 L/min. The $NO+NO_2$ gas mixture was obtained by partially oxidizing NO to $NO_2$ by $O_3$ generated from the TG-20 $O_3$ generator (Ozone solutions, Hull, Iowa). $NO_x$ removal efficiency was measured before in-situ regeneration treatment and 4, 10, 15, 21 hours after in-situ regeneration treatment. The downstream (i.e. the concentration of $NO_x$ exiting the chamber after exposure to the filter medium) gas phase NO and $NO_2$ concentrations were monitored with a MKS MULTI-GAS™ 2030D FTIR analyzer (MKS Instruments, Andover, Mass.).

$NO_x$ Reaction Efficiency

The filter medium including the sample catalytic composite article was tested for catalytic $NO_x$ removal efficiency at 230° C. from a simulated flue gas as described in Example 2.

$NO_x$ removal efficiency ("$DeNO_x$") (%)=(NO in–NO out)/NO in ×100%

Relative $DeNO_x$ removal efficiency (%)=$DeNO_x$ after regeneration/$DeNO_x$ of a fresh control sample.

Figure 5:
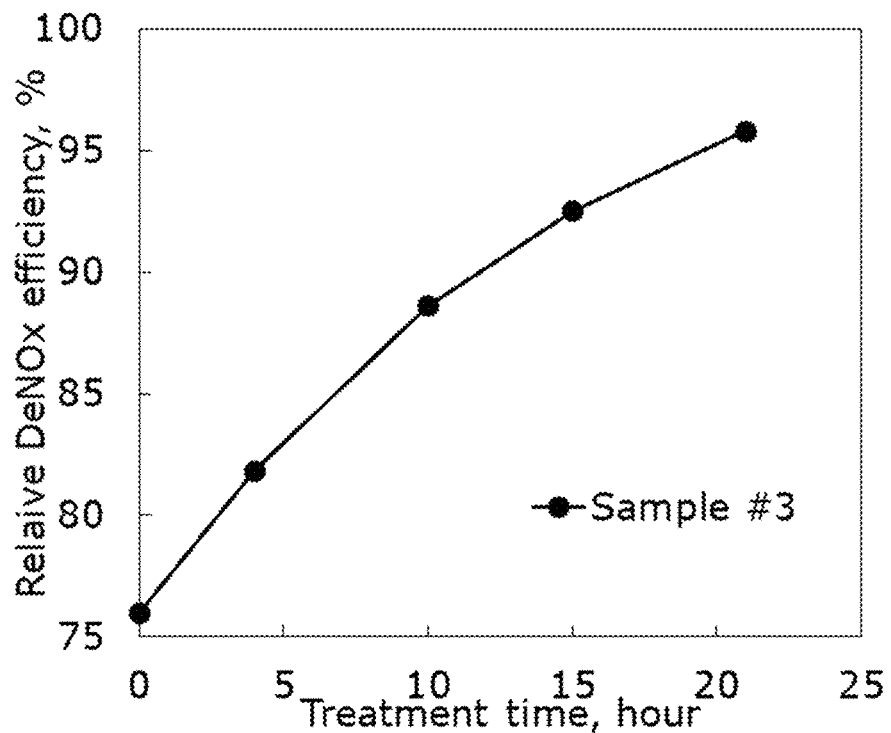
FIG. 5 depicts an exemplary relative NOx removal efficiency after in-situ flow-through regeneration by NO, $NO_2$ and $NH_3$ gas mixture on an exemplary filter medium.
Figure 6:
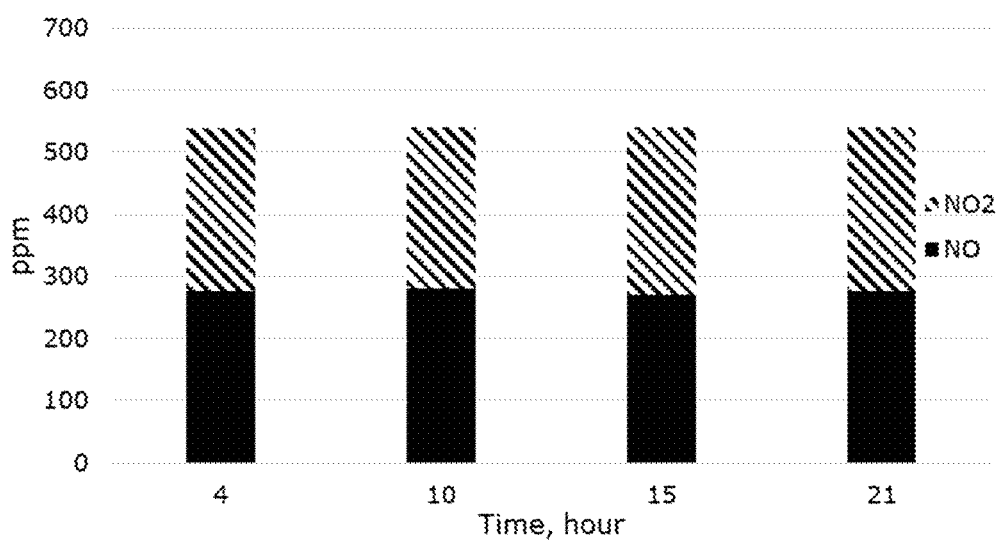
FIG. 6 depicts an exemplary $NO_x$ concentration, measured from a downstream side of an exemplar filter medium, during the in-situ flow through regeneration by a mixture comprising NO, $NO_2$, and $NH_3$.

Results are shown in FIGS. 5 and 6. The improved $NO_x$ removal efficiency over time, shown in FIGS. 5 and 6, demonstrates that the filter medium was successfully regenerated.

Example 4: In-Situ "Flow-By" Regeneration of Filter Medium Including a Catalytic Composite Article by NO, $NO_2$ and $NH_3$ Gas Mixture A catalytic composite article as described in Example 2 was used.

In-Situ "Flow-By" Regeneration by NO, $NO_2$, and $NH_3$ Mixture

A sample filter medium including the sample catalytic composite article described in Example 2 in-situ fouled by 400 ppm NO, 440 ppm $NH_3$, 3000 ppm $SO_2$ and 8% water moisture at 230° C. and returned from Innovative combustion Technologies (ICT). During an in-situ regeneration, a particular filter medium including a square catalytic composite sample (4.5 inch×4.5 inch) returned from ICT was wrapped around a hollow elliptic cylinder stainless steel mesh and placed in a reactor. A gas mixture including 330 ppm NO, 330 ppm $NO_2$, 85 ppm $NH_3$, 4% $O_2$, 8% water moisture, and $N_2$ was set to flow-by the catalytic composite sample at 230° C. with a total flowrate of 2 L/min. The $NO+NO_2$ gas mixture was obtained by partially oxidizing NO to $NO_2$ by $O_3$ generated from the TG-20 $O_3$ generator (Ozone solutions, Hull, Iowa). $NO_x$ removal efficiency was measured before in-situ regeneration treatment and 4 hours after in-situ regeneration treatment.

$NO_x$ Reaction Efficiency

The filter medium including the sample catalytic composite article was tested for catalytic $NO_x$ removal efficiency at 230° C. from a simulated flue gas as described in Example 2.

$NO_x$ removal efficiency ("$DeNO_x$") (%)=(NO in–NO out)/NO in×100%

Relative $DeNO_x$ removal efficiency (%)=$DeNO_x$ after regeneration/$DeNO_x$ of a fresh control sample.

Figure 7:
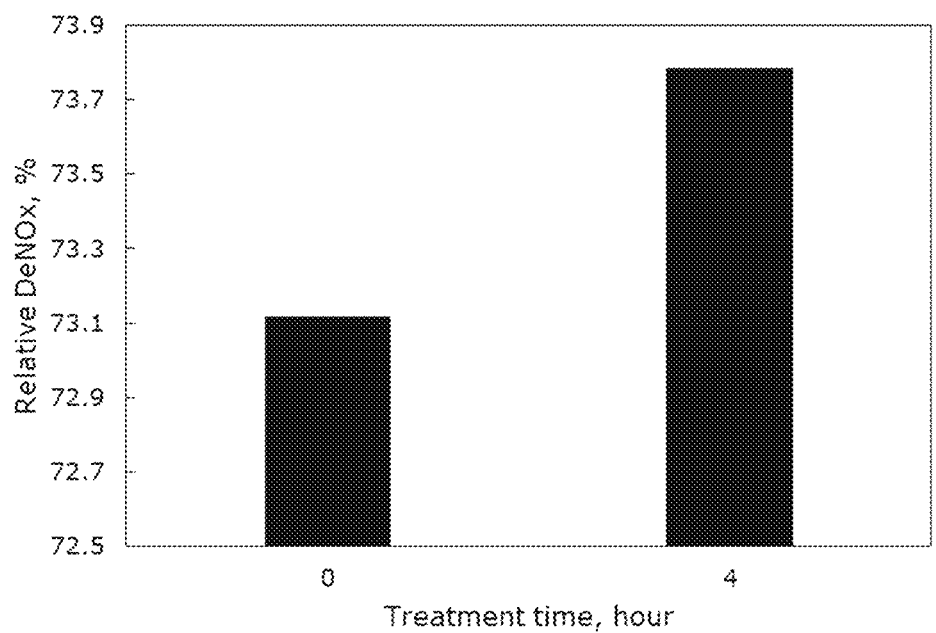
FIG. 7 depicts an exemplary $NO_x$ removal efficiency after in-situ flow-by regeneration on an exemplary filter medium by a mixture comprising NO, $NO_2$, and $NH_3$.

Results are shown in FIG. 7. The improved $NO_x$ removal efficiency over time, shown in FIG. 7, demonstrates that the filter medium was successfully regenerated.

Example 5: In-Situ "Flow-Through" Regeneration of Filter Medium Including Catalytic Filter Bags by NO, $NO_2$ and $NH_3$ Gas Mixture Four catalytic filter bags (65 mm in diameter, 1630 mm in length) were prepared from the catalytic composite articles described in Example 2.

In-Situ Deposition of Ammonium Bisulfate

The filter medium including the sample catalytic filter bags were in-situ fouled at Innovative combustion Technologies by 200 ppm NO, 240 ppm $NH_3$, 3000 ppm $SO_2$ and 8% water moisture at 230° C. for 4 hours.

In-Situ "Flow-Through" Regeneration by NO, $NO_2$, and $NH_3$ Mixture

During an in-situ regeneration, a particular filter medium including 4 catalytic filter bags in-situ fouled as described above were used. A gas mixture including 30 ppm NO, 30 ppm $NO_2$, 8 ppm $NH_3$, 10% $O_2$, 8% water moisture, and $N_2$ was set to flow-through the catalytic filter bags at 230° C. with a total flowrate of 25.3 SCFM for 20 hours.

$NO_x$ Reaction Efficiency

The filter medium including the sample catalytic filter bags were tested for $NO_x$ removal efficiency at Innovative Combustion Technologies from a simulated flue gas at 230° C. The simulated flue gas contained 200 ppm NO, 190 ppm $NH_3$, 10% $O_2$, 8% water moisture, and $N_2$ with a total flowrate of 25.3 standard cubic feet per minute (SCFM). In order to determine $NO_x$ removal efficiency, the upstream (i.e., the concentration of $NO_x$ entering into the chamber before exposure to the filter medium) and downstream concentration (i.e. the concentration of $NO_x$ exiting the chamber relative after exposure to the filter medium) of NO and $NO_2$ were monitored with a MKS MULTI-GAS™ 2030D FTIR analyzer (MKS Instruments, Andover, Mass.). $NO_x$ removal efficiency was calculated according to the following formula where '$NO_x$' indicates the total concentration of NO and $NO_2$ in the respective stream.

$NO_x$ removal efficiency ("$DeNO_x$ efficiency") (%)= ($NO_x$ in–$NO_x$ out)/$NO_x$ in×100%.

Figure 8:
FIG. 8 depicts an exemplary NOx removal efficiency after in-situ flow-through regeneration on exemplary filter bags by a mixture comprising NO, $NO_2$, and $NH_3$.

Results are shown in FIG. 8. The improved $NO_x$ removal efficiency over time, shown in FIG. 8, demonstrates that the filter medium was successfully regenerated.

Example 6: Long Term $NO_x$ Removal Reaction with Exposure to $SO_2$

A catalytic composite article as described in Example 2 was used.

Long Term Flow-Through $DeNO_x$ Reaction by NO, $NO_2$, and $NH_3$ Mixture (with and without Excess $NO_2$ in the Downstream Side of the Filter Medium)

The filter medium including the sample catalytic composite article was tested for catalytic $NO_x$ removal efficiency from a simulated flue gas at 230° C. The simulated flue gas included 13.5 ppm $SO_2$, 200 ppm $NO_x$ ($NO+NO_2$), 200 ppm $NH_3$, 5% $O_2$, 5% water moisture, and $N_2$ with a total flowrate of 3.4 L/min. The $NO_2$ was introduced from a gas cylinder. The inlet $NO_2$ concentration was controlled to have excess $NO_2$ (1-8 pm) and no excess $NO_2$ in the downstream (i.e. the concentration of $NO_x$ exiting the chamber after exposure to the filter medium). In order to determine $NO_x$ removal efficiency, the upstream (i.e., the concentration of $NO_x$ entering into the chamber before exposure to the filter medium) and downstream concentration of NO and $NO_2$ were monitored with a MKS MULTI-GAS™ 2030D FTIR analyzer (MKS Instruments, Andover, Mass.). $NO_x$ removal efficiency was calculated according to the following formula where 'NO$_x$' indicates the total concentration of NO and NO$_2$ in the respective stream.

NO$_x$ removal efficiency ("DeNO$_x$ efficiency") (%)=
(NO$_x$ in −NO$_x$ out)/NO$_x$ in ×100%.

Figure 9:
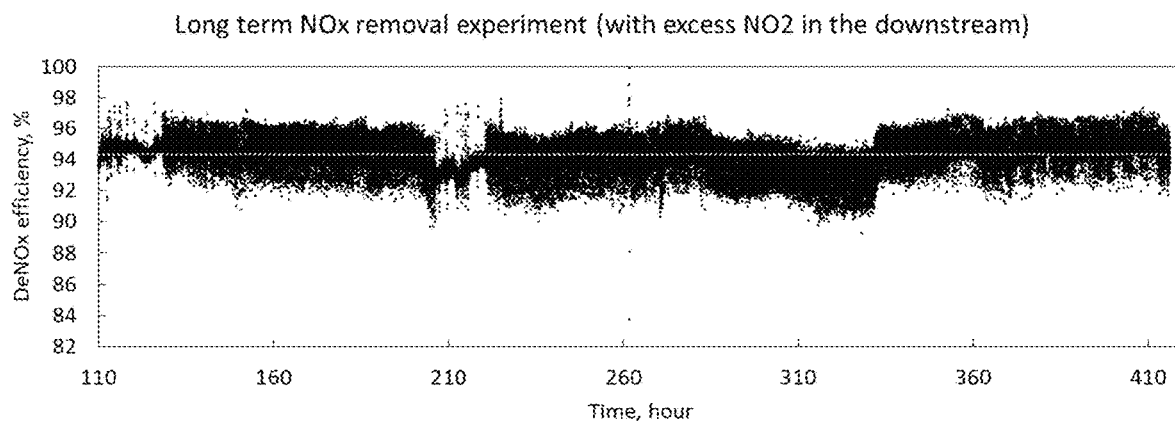
FIG. 9 depicts an example of "long term" $NO_x$ removal efficiency with $SO_2$ and excess $NO_2$ in the downstream.
Figure 10:
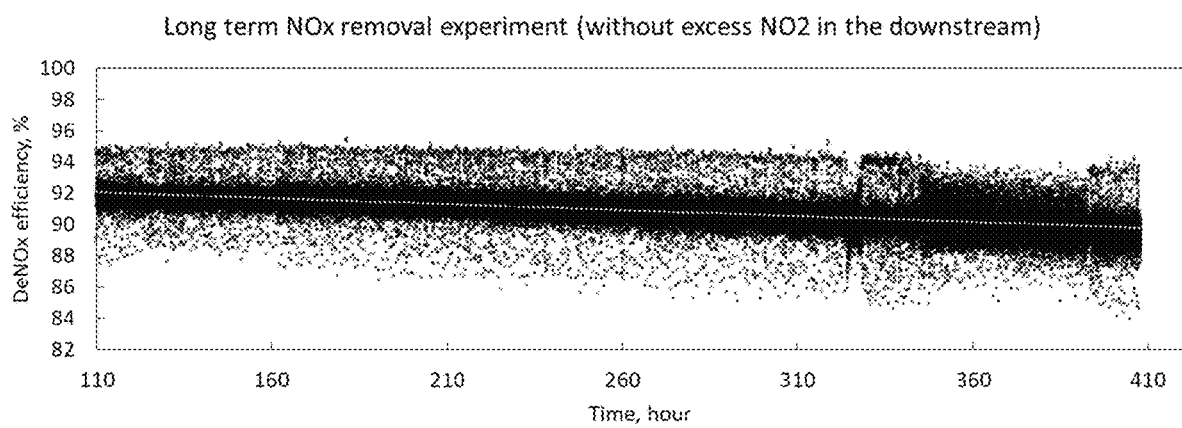
FIG. 10 depicts an example of "long term" $NO_x$ removal efficiency with $SO_2$ but without excess $NO_2$ in the downstream.
Figure 11:
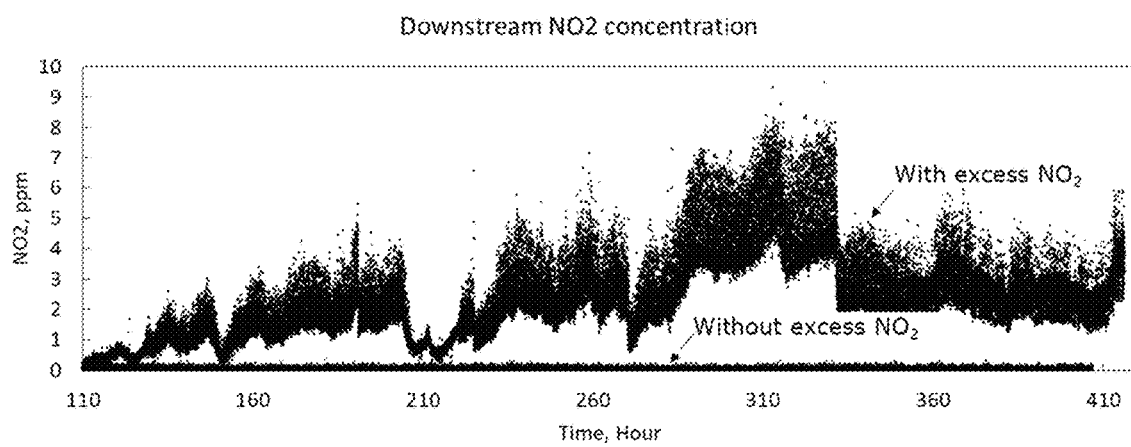
FIG. 11 depicts an example of downstream $NO_2$ concentration in an exemplary "long term" $NO_x$ removal efficiency measurement.

Results are shown in FIGS. 9-11.

Example 7: In-Situ "Flow-Through" Regeneration of Filter Medium Including a Catalytic Composite Article by NO, NO$_2$ and NH$_3$ Gas Mixture with Exposure to SO$_2$ A catalytic composite article was used as described in Example 2.

In-Situ Flow-Through Regeneration by NO, NO$_2$, and NH$_3$ Mixture with Exposure to SO$_2$ (with Controlled NO$_2$ Slip in the Downstream Side of the Filter Medium)

Sample filter medium including the sample catalytic composite article described in Example 2 was in-situ fouled by 400 ppm NO, 440 ppm NH$_3$, 3000 ppm SO$_2$ and 8% water moisture at 230° C. and returned from Innovative combustion Technologies (ICT). During an in-situ regeneration, a particular filter medium including a square catalytic composite sample (4.5 inch×4.5 inch) returned from ICT was placed in a reactor. Catalytic NO$_x$ removal efficiency before regeneration (in the period of 0-2 hours), during regeneration (in the period of 3-51 hours) and after regeneration (in the period of 55-60 hours) were shown in FIG. 12. Catalytic NO$_x$ removal efficiency before and after regeneration were tested at 230° C. with 200 ppm NO, 200 ppm NH$_3$, 5% O$_2$, 5% water moisture, and N$_2$ with a total flowrate of 3.4 L/min. During the regeneration, the simulated flue gas included 13.5 ppm SO$_2$, 200 ppm NO$_x$ (NO+NO$_2$), 200 ppm NH$_3$, 5% O$_2$, 5% water moisture, and N$_2$ with a total flowrate of 3.4 L/min. The inlet NO$_2$ concentration was controlled to have excess NO$_2$ (1-5 ppm, FIG. 12) slip in the downstream (i.e. the concentration of NO$_x$ exiting the chamber after exposure to the filter medium). The NO$_2$ was introduced from a gas cylinder.

In order to determine NO$_x$ removal efficiency, the upstream (i.e., the concentration of NO$_x$ entering into the chamber before exposure to the filter medium) and downstream concentration of NO and NO$_2$ were monitored with a MKS MULTI-GAS™ 2030D FTIR analyzer (MKS Instruments, Andover, Mass.). NO$_x$ removal efficiency was calculated according to the following formula where 'NO$_x$' indicates the total concentration of NO and NO$_2$ in the respective stream.

NO$_x$ removal efficiency ("DeNO$_x$ efficiency") (%)=
(NO$_x$ in−NO$_x$ out)/NO$_x$ in ×100%.

Figure 12:
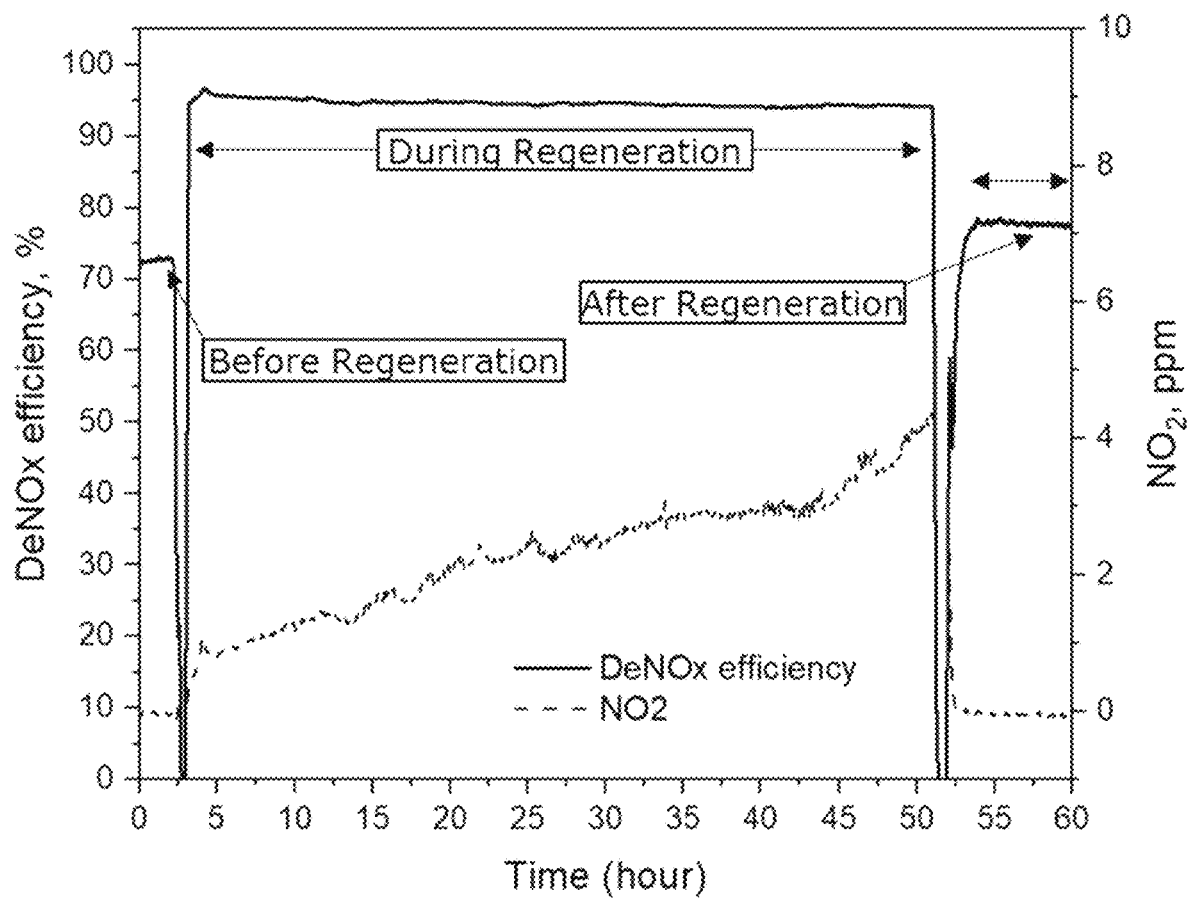
FIG. 12 depicts an example of NOx removal efficiency and downstream $NO_2$ concentration before, during and after in-situ flow-through regeneration by NO, $NO_2$, and $NH_3$ mixture with exposure to $SO_2$.

Results are shown in FIG. 12.

Example 8: In-Situ "Flow-Through" Regeneration of Filter Medium Including a Catalytic Composite Article by NO, NO$_2$ and NH$_3$ Gas Mixture with Exposure to SO$_2$ A catalytic composite article was used as described in Example 2.

In-Situ Flow-Through Regeneration by NO, NO$_2$, and NH$_3$ Mixture with Exposure to SO$_2$ (with Controlled NO$_2$ Slip in the Downstream Side of the Filter Medium)

Sample filter medium including the sample catalytic composite article described in Example 2 was in-situ fouled by 400 ppm NO, 440 ppm NH$_3$, 3000 ppm SO$_2$ and 8% water moisture at 230° C. and returned from Innovative combustion Technologies (ICT). During an in-situ regeneration, a particular filter medium including a square catalytic composite sample (4.5 inch×4.5 inch) returned from ICT was placed in a reactor. Before the in-situ regeneration, catalytic NO$_x$ removal efficiency (FIG. 13) was tested at 230° C. with 200 ppm NO, 200 ppm NH$_3$, 5% O$_2$, 5% water moisture, and N$_2$ with a total flowrate of 3.4 L/min. After checking the NO$_x$ removal efficiency before regeneration, a 6.2 days (148 hours) in-situ flow-through regeneration was conducted. During the regeneration, the simulated flue gas included 13.5 ppm SO$_2$, 200 ppm NO$_x$ (NO+NO$_2$), 200 ppm NH$_3$, 5% O$_2$, 5% water moisture, and N$_2$ with a total flowrate of 3.4 L/min. The inlet NO$_2$ concentration was controlled to have excess NO$_2$ (1-12 ppm) slip in the downstream (i.e. the concentration of NO$_x$ exiting the chamber after exposure to the filter medium). The NO$_2$ was introduced from a gas cylinder. Catalytic NO$_x$ removal efficiency during the in-situ regeneration was shown in FIG. 13. After the in-situ regeneration, catalytic NO$_x$ removal efficiency was tested at 230° C. with 200 ppm NO, 200 ppm NH$_3$, 5% O$_2$, 5% water moisture, and N$_2$ with a total flowrate of 3.4 L/min, shown in FIG. 13.

To determine NO$_x$ removal efficiency, the upstream (i.e., the concentration of NO$_x$ entering into the chamber before exposure to the filter medium) and downstream concentration of NO and NO$_2$ were monitored with a MKS MULTI-GAS™ 2030D FTIR analyzer (MKS Instruments, Andover, Mass.). NO$_x$ removal efficiency was calculated according to the following formula where 'NO$_x$' indicates the total concentration of NO and NO$_2$ in the respective stream.

NO$_x$ removal efficiency ("DeNO$_x$ efficiency") (%)=
(NO$_x$ in−NO$_x$ out)/NO$_x$ in ×100%.

Figure 13:
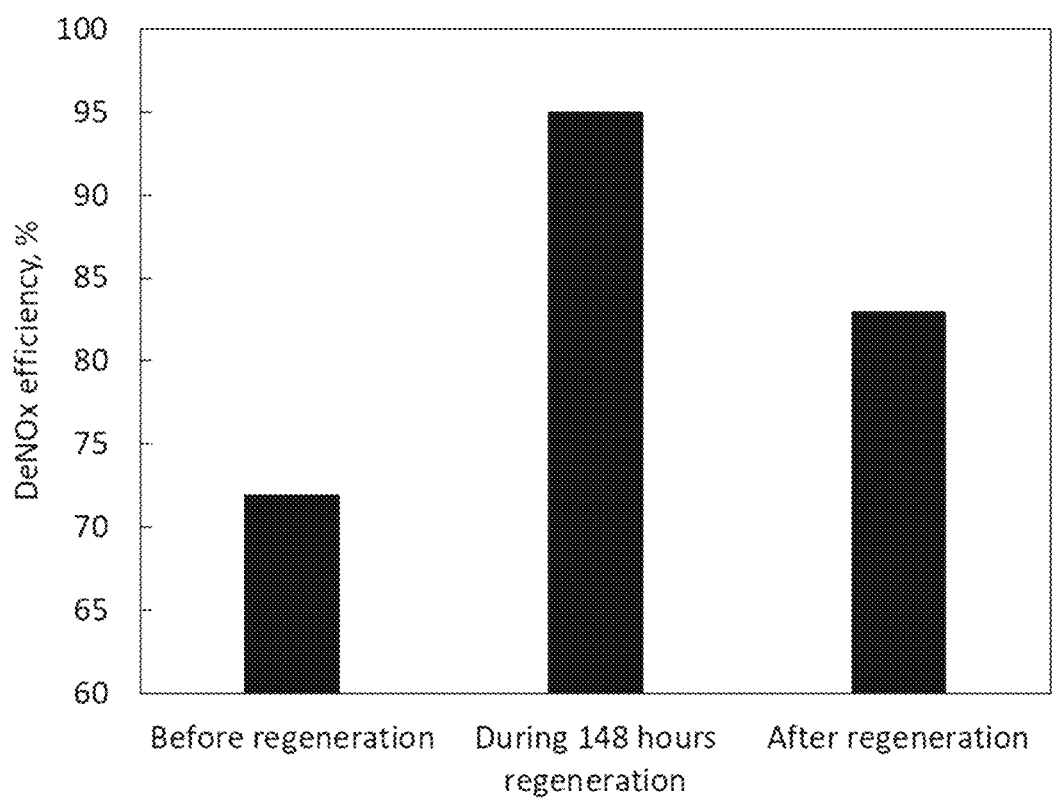
FIG. 13 depicts an example of $NO_x$ removal efficiency before, during and after in-situ flow-through regeneration (148 hours) by NO, $NO_2$, and $NH_3$ mixture with exposure to $SO_2$.

Results are shown in FIG. 13.

Example 9: Long Term NO$_x$ Removal Reaction with Exposure to SO$_2$ with Periodic In-Situ "Flow-Through" Regeneration of Filter Medium A catalytic composite article was used as described in Example 2.

Periodic In-Situ Flow-Through Regeneration by NO, NO$_2$, and NH$_3$ Mixture with Exposure to SO$_2$ (with Controlled NO$_2$ Slip in the Downstream Side of the Filter Medium)

Figure 14:
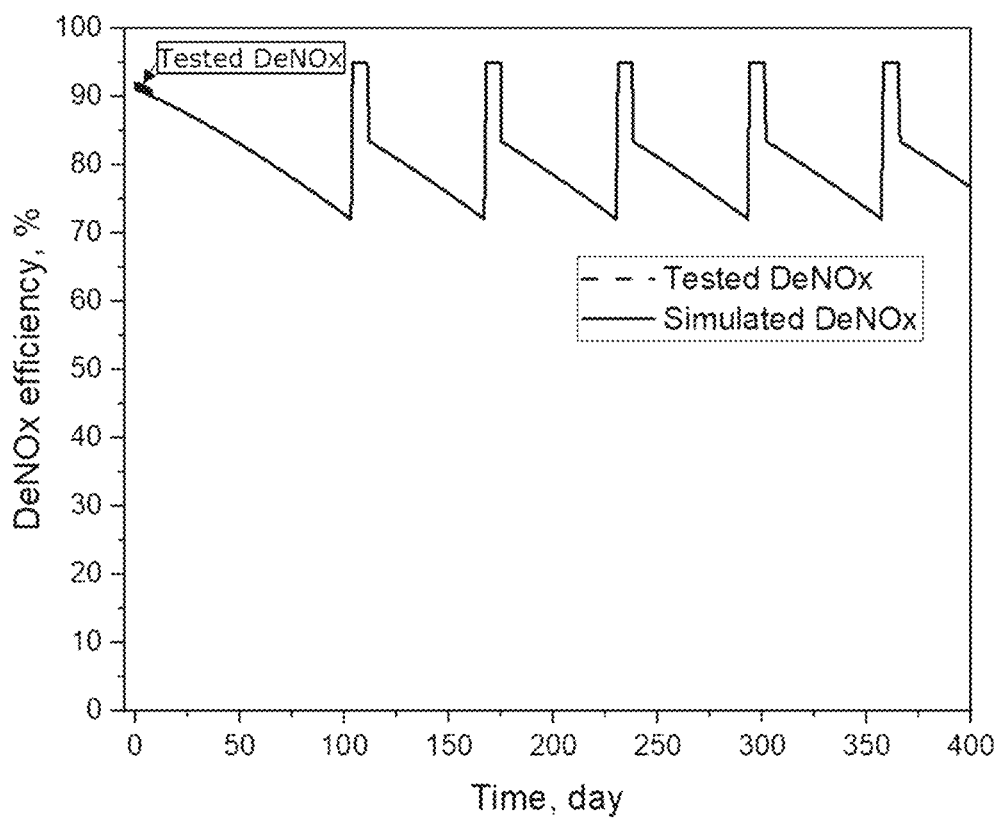
FIG. 14 depicts NOx removal efficiency with intermittent in-situ flow-through regeneration by an exemplary NO, $NO_2$, and $NH_3$ mixture with exposure to $SO_2$.

The filter medium including the sample catalytic composite article described in Example 2 was tested for catalytic NO$_x$ removal efficiency from a simulated flue gas at 230° C. for over 400 hours (16.7 days). The simulated flue gas included 13.5 ppm SO$_2$, 200 ppm NO, 200 ppm NH$_3$, 5% O$_2$, 5% water moisture, and N$_2$ with a total flowrate of 3.4 L/min. The DeNO$_x$ removal efficiency change with time was shown in FIG. 10 and used as raw data (Tested DeNO$_x$ in FIG. 14) to extrapolate the long term DeNO$_x$ removal efficiency (Simulated DeNO$_x$ in FIG. 14) change with operation time. In-situ flow-through regeneration by NO, NO$_2$, and NH$_3$ mixture (with controlled NO$_2$ slip in the downstream side of the filter medium) will be started once the DeNO$_x$ removal efficiency decreased to 72%, or 78% of the initial DeNO$_x$ removal efficiency (initial DeNO$_x$ removal efficiency was 92%, FIG. 14). According to Example 8, after 148 hours (6.2 days) in-situ flow-through regeneration by NO, NO$_2$, and NH$_3$ mixture (with controlled NO$_2$ slip in the downstream side of the filter medium), the DeNO$_x$ removal efficiency can be recovered to 83%, or 90% of the initial DeNO$_x$ removal efficiency (FIG. 14). After the first regeneration, periodic in-situ flow-through regeneration can be conducted periodically once the DeNO$_x$ removal efficiency decreased to 72% or 78% of the initial DeNO$_x$ removal efficiency. This process is illustrated in FIG. 14.

Example 10: Injection of 1 wt % H$_2$O$_2$ Solution into a Simulated Flue Gas Stream Comprising SO$_2$ and NO A syringe pump was used to inject 6.1 ml of 1 wt % H$_2$O$_2$ solution at a speed of 12.0 ml/hour into a simulated flue gas stream having a flow rate of 3.19 L/min. The simulated flue gas stream comprised 35 ppm SO$_2$ and 200 ppm NO. The concentration of NO and NO$_2$ before, during and after the H$_2$O$_2$ injection was measured at several different temperatures, namely 174° C., 189° C., 195° C., and 204° C., by a MKS MULTI-GAS™ 2030D FTIR analyzer (MKS Instruments, Andover, Mass.).

NO to NO$_2$ conversion efficiency was calculated based on the NO and NO$_2$ concentration during the H$_2$O$_2$ injection, NO to NO$_2$ conversion efficiency ("NO to NO$_2$ conversion") (%)=NO$_2$/(NO+NO$_2$)×100%.

Figure 15:
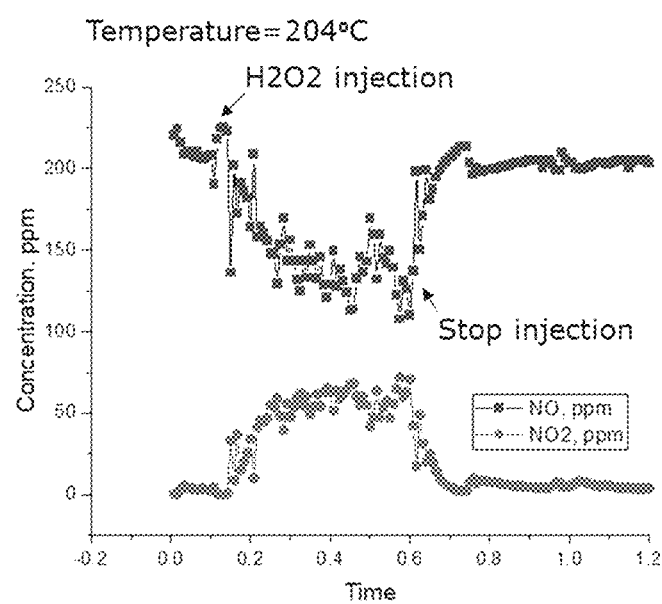
FIG. 15 depicts an exemplary NO and $NO_2$ concentration change with upon injection of 1 wt % hydrogen peroxide ($H_2O_2$) into a simulated flue gas stream comprising $SO_2$ and NO.
Figure 16:
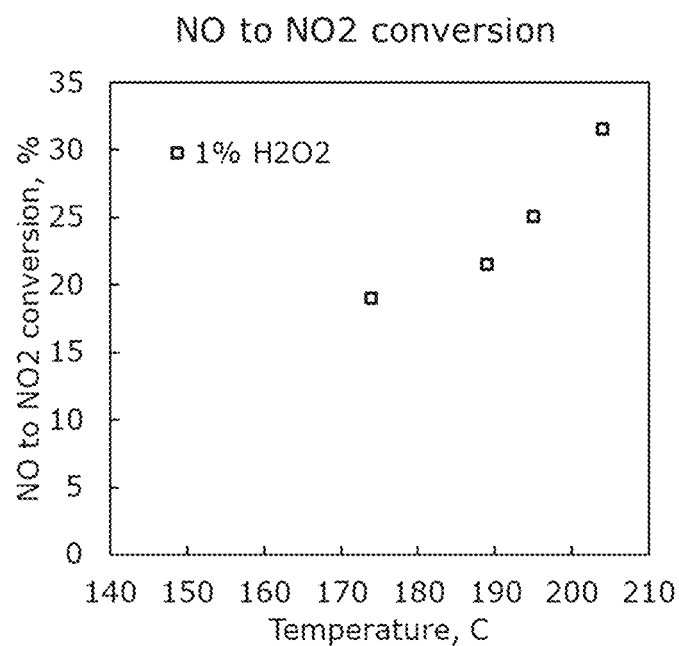
FIG. 16 depicts an exemplary NO to $NO_2$ percentage conversion upon injection of 1 wt % $H_2O_2$ injection into a simulated flue gas stream comprising $SO_2$ and NO at different temperatures.

Results are shown in FIGS. 15 and 16. As shown in FIGS. 15 and 16, NO$_x$ removal efficiency can be improved by introducing at least one oxidizing agent, such as but not limited to H$_2$O$_2$, into a flue gas stream.

Example 11: Injection of 0.3 wt % H$_2$O$_2$ Solution into a Simulated Flue Gas Stream Comprising SO$_2$ and NO A syringe pump was used to inject 6.1 ml of 0.3 wt % H$_2$O$_2$ solution at a speed of 12.0 ml/hour into a simulated flue gas stream. The simulated flue gas stream had a flow rate of 3.19 L/min and comprised 35 ppm SO$_2$ and 200 ppm NO. The concentration of NO and NO$_2$ before, during and after the H$_2$O$_2$ injection was measured at two different temperatures, namely 152° C. and 190° C., by a MKS MULTI-GAS™ 2030D FTIR analyzer (MKS Instruments, Andover, Mass.).

NO to NO$_2$ conversion efficiency was calculated based on the NO and NO$_2$ concentration during the H$_2$O$_2$ injection, NO to NO$_2$ conversion efficiency ("NO to NO$_2$ conversion") (%)=NO$_2$/(NO+NO$_2$)×100%.

Figure 17:
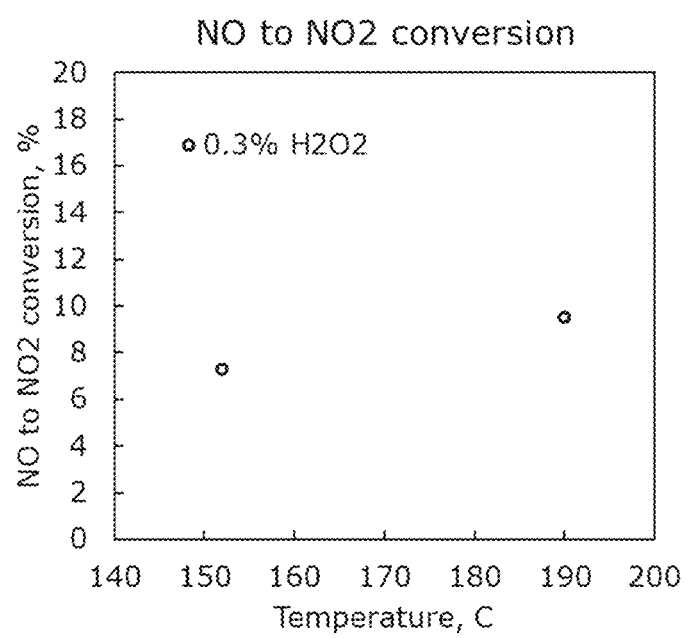
FIG. 17 depicts an exemplary NO to $NO_2$ percentage conversion upon injection of 0.3 wt % $H_2O_2$ injection into a simulated flue gas stream comprising $SO_2$ and NO at different temperatures.

Results are shown in FIG. 17. As shown in FIG. 17, NO$_x$ removal efficiency can be improved by introducing at least one oxidizing agent, such as but not limited to H$_2$O$_2$, into a flue gas stream.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within.

What is claimed is:

1. A method comprising:
providing at least one filter medium,
wherein the at least one filter medium comprises:
at least one catalyst material, and
ammonium bisulfate (ABS) deposits, ammonium sulfate (AS) deposits, or any combination thereof;
flowing a flue gas stream transverse to a cross-section of the at least one filter medium, such that the flue gas stream passes through the cross section of the at least one filter medium,
wherein the flue gas stream comprises:
NOx compounds comprising:
Nitric Oxide (NO), and
Nitrogen Dioxide (NO$_2$); and
increasing NOx removal efficiency of the at least one filter medium, wherein the increasing of the NOx removal efficiency of the at least one filter medium comprises increasing an upstream NO$_2$ concentration to a range from 2% to 99% of a total concentration of the upstream NOx compounds, wherein increasing the upstream NO$_2$ concentration to a range from 2% to 99% of a total concentration of the upstream NOx compounds comprises introducing at least one oxidizing agent into the flue gas stream, wherein the at least one oxidizing agent includes hydrogen peroxide (H$_2$O$_2$).

2. The method of claim 1, wherein the at least one oxidizing agent is H$_2$O$_2$.

3. The method of claim 2, wherein the H$_2$O$_2$ is introduced into the flue gas stream in a sufficient amount so as to oxidize at least some of the NO in the flue gas stream to NO$_2$, wherein the oxidation of at least some of the NO in the flue gas stream to NO$_2$ results in the NO$_2$ having the upstream concentration of 2% to 99% of the total concentration of the upstream NOx compounds.

4. The method of claim 3, wherein the oxidation of at least some of the NO in the flue gas stream to NO$_2$ results in the NO$_2$ having an upstream concentration of 25% to 50% of the total concentration of the upstream NOx compounds.

5. The method of claim 3, wherein the sufficient amount of H$_2$O$_2$ that is introduced into the flue gas stream is an amount sufficient to oxidize at least 30% of the NO concentration in the flue gas stream to NO$_2$.

6. The method of claim 3, wherein the sufficient amount of H$_2$O$_2$ that is introduced into the flue gas stream is an amount sufficient to oxidize 30% to 50% of the NO concentration in the flue gas stream to NO$_2$.

7. The method of claim 3, wherein the sufficient amount of H$_2$O$_2$ that is introduced into the flue gas stream is 0.1 wt % H$_2$O$_2$ to 30 wt % H$_2$O$_2$ based on a total weight of the flue gas stream.

8. A method comprising:
providing at least one filter medium,
wherein the at least one filter medium comprises:
at least one catalyst material, and
ammonium bisulfate (ABS) deposits, ammonium sulfate (AS) deposits, or any combination thereof;

flowing a flue gas stream transverse to a cross-section of the at least one filter medium, such that the flue gas stream passes through the cross section of the at least one filter medium,
  wherein a temperature of the flue gas stream ranges from 160° C. to 450° C., and
  wherein the flue gas stream comprises:
    NOx compounds comprising:
      Nitric Oxide (NO), and
      Nitrogen Dioxide ($NO_2$); and
increasing NOx removal efficiency of the at least one filter medium, wherein the increasing of the NOx removal efficiency of the at least one filter medium comprises increasing an upstream $NO_2$ concentration to a range from 2% to 99% of a total concentration of the upstream NOx compounds, wherein increasing the upstream $NO_2$ concentration to a range from 2% to 99% of a total concentration of the upstream NOx compounds comprises introducing at least one oxidizing agent into the flue gas stream.

9. The method of claim 8, wherein the at least one catalyst material comprises at least one of: Vanadium Monoxide (VO), Vanadium Trioxide ($V_2O_3$), Vanadium Dioxide ($VO_2$), Vanadium Pentoxide ($V_2O_5$), Tungsten Trioxide ($WO_3$), Molybdenum Trioxide ($MoO_3$), Titanium Dioxide ($TiO_2$), Silicon Dioxide ($SiO_2$), Aluminum Trioxide ($Al_2O_3$), Manganese Oxide ($MnO_2$), zeolites, or any combination thereof.

10. The method of claim 8, further comprising:
  adding Ammonia ($NH_3$) to the flue gas stream.

11. The method of claim 10, wherein the $NH_3$ added has a concentration ranging from 0.0001% to 0.5% of a concentration of the flue gas stream.

12. The method of claim 8, wherein the temperature of the flue gas stream is at least 170° C.

13. The method of claim 8, wherein the temperature of the flue gas stream is at least 175° C.

14. The method of claim 8, wherein the temperature of the flue gas stream is at least 200° C.

15. The method of claim 8, wherein the temperature of the flue gas stream is at least 225° C.

16. The method of claim 8, wherein the temperature of the flue gas stream ranges from 160° C. to 200° C.

17. The method of claim 8, wherein the temperature of the flue gas stream ranges from 160° C. to 225° C.

18. The method of claim 8, wherein the temperature of the flue gas stream ranges from 160° C. to 250° C.

19. The method of claim 8, wherein the temperature of the flue gas stream ranges from 160° C. to 300° C.

20. The method of claim 8, further comprising:
  introducing additional Nitrogen Dioxide ($NO_2$) to the flue gas stream.

* * * * *